US010942990B2

(12) United States Patent
Bennett et al.

(10) Patent No.: US 10,942,990 B2
(45) Date of Patent: Mar. 9, 2021

(54) SAFETY MONITORING SYSTEM WITH IN-WATER AND ABOVE WATER MONITORING DEVICES

(71) Applicants: James Duane Bennett, Hroznetin (CZ); Bindu Rama Rao, Laguna Niguel, CA (US); Christopher C. Winslade, Chicago, IL (US)

(72) Inventors: James Duane Bennett, Hroznetin (CZ); Bindu Rama Rao, Laguna Niguel, CA (US); Christopher C. Winslade, Chicago, IL (US)

( * ) Notice: Subject to any disclaimer, the term of this patent is extended or adjusted under 35 U.S.C. 154(b) by 8 days.

(21) Appl. No.: 16/181,745

(22) Filed: Nov. 6, 2018

(65) Prior Publication Data

US 2019/0087548 A1    Mar. 21, 2019

Related U.S. Application Data

(63) Continuation-in-part of application No. 16/114,379, filed on Aug. 28, 2018, which is a continuation of
(Continued)

(51) Int. Cl.
*G06F 21/10* (2013.01)
*G06F 21/60* (2013.01)
(Continued)

(52) U.S. Cl.
CPC ............ *G06F 21/10* (2013.01); *A01D 34/008* (2013.01); *A01D 34/64* (2013.01); *A01D 43/16* (2013.01); *A47L 7/00* (2013.01); *A47L 9/2805* (2013.01); *A47L 9/2852* (2013.01); *A47L 9/2857* (2013.01); *A47L 9/2894* (2013.01); *E04H 4/06* (2013.01); *E04H 4/1654* (2013.01); *G05D 1/0088* (2013.01); *G05D 1/0291* (2013.01); *G05D 1/0297* (2013.01); *G06F 21/121* (2013.01); *G06F 21/602* (2013.01); *G06F 21/604* (2013.01); *G06N 20/00* (2019.01); *G06Q 30/016* (2013.01); *G06Q 30/0601* (2013.01); *G08B 17/10* (2013.01); *G08B 21/08* (2013.01);
(Continued)

(58) Field of Classification Search
CPC ......... G08B 21/08; E04H 4/06; E04H 4/1654; H04L 67/12; H04N 21/414
See application file for complete search history.

(56) References Cited

U.S. PATENT DOCUMENTS 6,064,309 A * 5/2000 Sellers ............... G08B 21/086
340/539.1
7,642,921 B2 * 1/2010 Cutler ............... G08B 21/088
340/573.6
(Continued)

*Primary Examiner* — Rufus C Point
(74) *Attorney, Agent, or Firm* — Garlick & Markison; Bruce E. Garlick

(57) ABSTRACT

A network of modular, multitier pool mobile units, that wander around and under water of a swimming pool. The pool mobile units monitor for safety, emergency and accident related events and undertake appropriate actions to provide care and protection for swimmers, family members and bystanders. They scrub and clean the swimming pool bottom and wall surfaces and emit chemical agents to sanitize the swimming pool water. A central server provides safety monitoring, help for drowning swimmers, and emergency and accident supports.

14 Claims, 17 Drawing Sheets

Related U.S. Application Data application No. 15/622,554, filed on Jun. 14, 2017, now Pat. No. 10,127,362.

(60) Provisional application No. 62/350,187, filed on Jun. 15, 2016.

(51) Int. Cl.

| | | |
|---|---|---|
| *G05D 1/00* | (2006.01) | |
| *G05D 1/02* | (2020.01) | |
| *H04L 29/06* | (2006.01) | |
| *G08B 17/10* | (2006.01) | |
| *G06Q 30/06* | (2012.01) | |
| *G06Q 30/00* | (2012.01) | |
| *G08B 21/08* | (2006.01) | |
| *E04H 4/16* | (2006.01) | |
| *E04H 4/06* | (2006.01) | |
| *A47L 9/28* | (2006.01) | |
| *H04N 21/414* | (2011.01) | |
| *H04L 29/08* | (2006.01) | |
| *A01D 34/64* | (2006.01) | |
| *A01D 43/16* | (2006.01) | |
| *A47L 7/00* | (2006.01) | |
| *A01D 34/00* | (2006.01) | |
| *G06N 20/00* | (2019.01) | |
| *G06F 21/12* | (2013.01) | |
| *H04W 12/08* | (2021.01) | |
| *A01D 43/00* | (2006.01) | |
| *G06Q 10/00* | (2012.01) | |
| *A01D 101/00* | (2006.01) | |

(52) U.S. Cl.
CPC .......... *H04L 63/0428* (2013.01); *H04L 63/20* (2013.01); *H04L 67/104* (2013.01); *H04L 67/12* (2013.01); *H04N 21/414* (2013.01); *H04W 12/0804* (2019.01); *A01D 43/00* (2013.01); *A01D 2101/00* (2013.01); *A47L 2201/00* (2013.01); *A47L 2201/022* (2013.01); *A47L 2201/04* (2013.01); *G06F 2221/0746* (2013.01); *G06Q 10/20* (2013.01); *H04L 63/0861* (2013.01)

(56) References Cited

U.S. PATENT DOCUMENTS

| | | | | |
|---|---|---|---|---|
| 7,839,291 | B1* | 11/2010 | Richards | G08B 21/086 340/553 |
| 9,672,716 | B2* | 6/2017 | Carroll | G08B 21/088 |
| 9,963,230 | B2* | 5/2018 | Borman | A47L 5/12 |
| 9,974,422 | B2* | 5/2018 | Lee | A47L 9/2815 |
| 10,102,589 | B1* | 10/2018 | Tofte | G06Q 40/08 |
| 10,127,362 | B2* | 11/2018 | Bennett | G06F 21/602 |
| 10,410,289 | B1* | 9/2019 | Tofte | G01C 11/02 |
| 2004/0092181 | A1* | 5/2004 | Porat | B63B 22/24 441/136 |
| 2004/0173542 | A1* | 9/2004 | Porat | E04H 4/1654 210/760 |
| 2005/0012629 | A1* | 1/2005 | Shebek | G08B 5/36 340/679 |
| 2006/0223394 | A1* | 10/2006 | Porat | B63B 22/24 441/136 |
| 2007/0106403 | A1* | 5/2007 | Emery | C02F 1/008 700/90 |
| 2008/0084317 | A1* | 4/2008 | Gakhar | G08B 21/086 340/573.4 |
| 2009/0301522 | A1* | 12/2009 | Abehasera | E04H 4/1654 134/18 |
| 2009/0303055 | A1* | 12/2009 | Anderson | G08B 21/086 340/573.6 |
| 2010/0299016 | A1* | 11/2010 | Benzler | G05D 1/0246 701/26 |
| 2012/0222997 | A1* | 9/2012 | Potucek | H02J 50/10 210/167.18 |
| 2014/0015959 | A1* | 1/2014 | Durvasula | E04H 4/1654 348/114 |
| 2014/0157508 | A1* | 6/2014 | Drechsel | E04H 4/10 4/498 |
| 2015/0052703 | A1* | 2/2015 | Lee | A47L 9/2815 15/319 |
| 2015/0362925 | A1* | 12/2015 | Uy | H04W 8/24 700/282 |
| 2016/0012700 | A1* | 1/2016 | Matko | G08B 21/086 340/573.6 |
| 2016/0340006 | A1* | 11/2016 | Tang | B64C 39/024 |
| 2017/0167151 | A1* | 6/2017 | Segal | B63C 9/02 |
| 2017/0212523 | A1* | 7/2017 | Witelson | G05D 1/0274 |
| 2018/0040223 | A1* | 2/2018 | Bodi | G08B 21/0415 |

\* cited by examiner

SAFETY MONITORING SYSTEM WITH IN-WATER AND ABOVE WATER MONITORING DEVICES

CROSS REFERENCE TO RELATED APPLICATIONS

The present U.S. Utility Patent Application is a continuation-in-part of U.S. patent application Ser. No. 16/114,379, entitled "POOL MOBILE UNIT" filed Aug. 28, 2018, which is a continuation of U.S. patent application Ser. No. 15/622,554, entitled "POOL MOBILE UNIT" filed Jun. 14, 2017, scheduled to issue as U.S. Pat. No. 10,127,362 on Nov. 13, 2018, which claims priority pursuant to 35 U.S.C. § 119(e) to U.S. Provisional Application No. 62/350,187, entitled "MODULAR MOBILE UNITS," filed Jun. 15, 2016. All of the above identified applications are hereby incorporated herein by reference in their respective entirety and made part of the present U.S. Utility Patent Applications for all purposes.

BACKGROUND

1. Technical Field

The present disclosure relates generally to robots, and, more specifically, aquatic swimming pool robots.

2. Related Art

There are many types of robots available commercially today, some of them do specialize on swimming pools, for example, Blue Wave®, Aquabot® and Dolphin®. These robotic pool cleaners vacuum and clean waters. Their limited functionalities include pool cleaning by vacuuming, scrubbing the walls and bottom surfaces, filtering the water and auto shutoff after the work is done.

These are submersible pool cleaners, they work on electricity with a long water cleaning and electric wired pipe connected to it, from a carry cart. They come with a remote control that sets water cleaning time (such as one hour, two hours and three hours) and all of their functioning is preprogrammed. They do not drain water and refill later on, they recycle water, thereby saving the valuable water resources.

Other types of robotic cleaners are available today, some of them only clean swimming pool water, and some clean pool bottom and wall surfaces, while others are not even submersible. The latter ones only clean indoor of homes, they come in the form of vacuum cleaners.

Most pool cleaners used nowadays perform a simple cleaning activity. They cannot do much else. Most are them are manual, with a user operating the pool cleaner by pushing it along with a handle or a hose.

Further limitations and disadvantages of conventional and traditional approaches will become apparent to one of ordinary skill in the art through comparison of such systems with the present disclosure.

SUMMARY

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
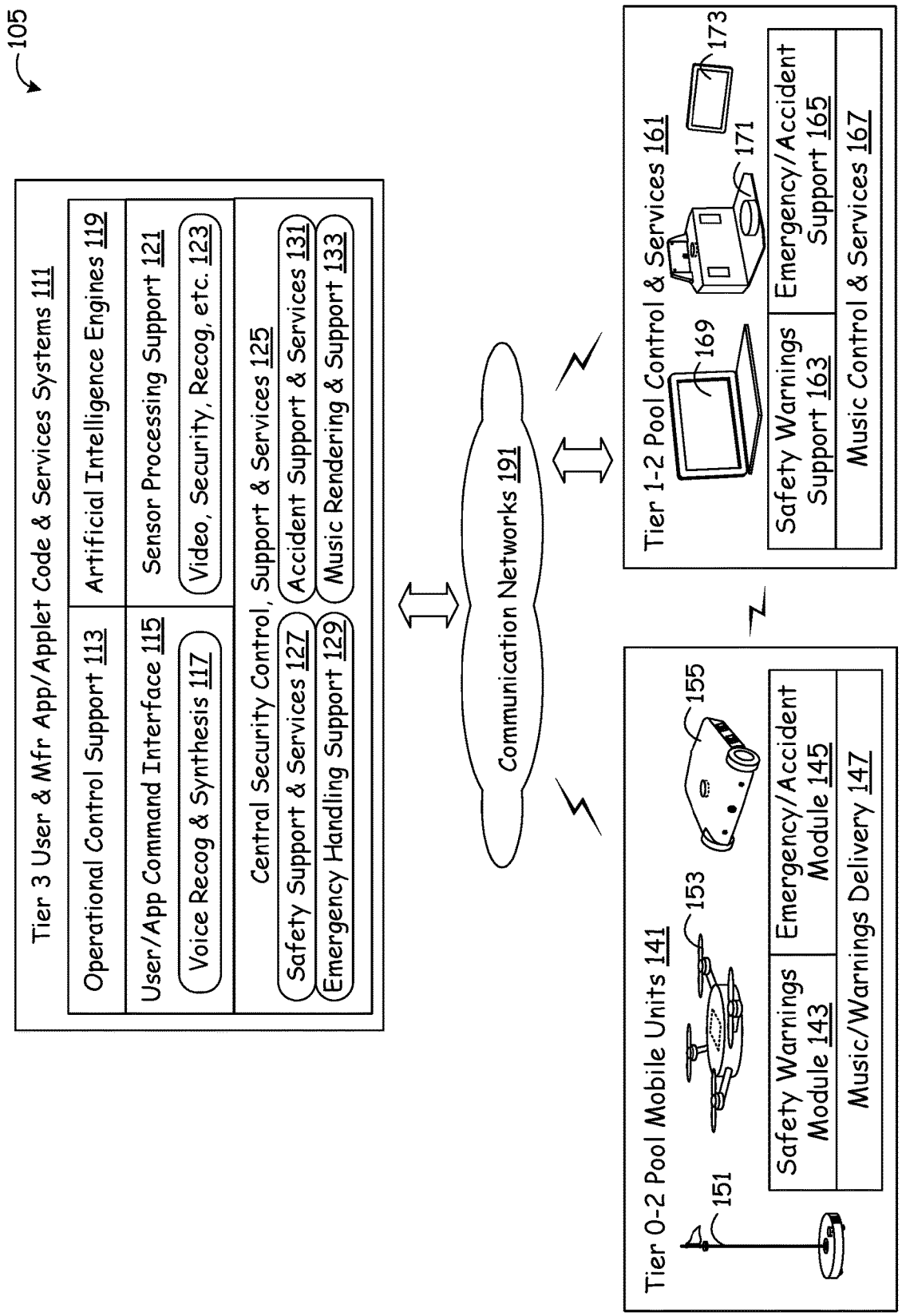
FIG. 1 is a perspective block diagram of pool mobile unit infrastructure, wherein the pool mobile units manage entire day-to-day operations of swimming pools as well as monitor the swimmers and bystanders for the safety, emergency and accidents in the swimming pools.

FIG. 1 is a perspective block diagram of pool mobile unit infrastructure 105, wherein the pool mobile units manage entire day-to-day operations of swimming pools as well as monitor the swimmers and bystanders for the safety, emergency and accidents in the swimming pools. In specific, the pool mobile units (PMU) 141 remove leaves and other stuff that fall onto the swimming pools (pools, hereon), scrub and clean pool surfaces, clean water, sanitize pool, provide safety warnings, attend accidents and emergencies while in the pool, and deliver music. The pool mobile units 141 shown in the depiction are flag pole pool mobile unit 151, drone pool mobile unit 153 and submersible pool mobile unit 155. Many other configurations or designs of the pool mobile units 141 are also contemplated. They are designed to perform as tier zero (T0), tier one (T1) and/or tier two (T2) pool mobile units 141. In general, there are two types of the pool mobile units 141, those that reside in the pools (on surface or submerged) and those that function by moving around the pool edges (but not get into the water). The combination of these two types are also contemplated, for example, the submersible pool mobile unit 155 shown in the depiction.

The pool mobile units 141 have many built-in functionalities that they can perform all by themselves, without any external support. For example, they can provide safety warnings, attend emergencies and/or accidents and deliver music when not submerged. They can take voice commands and respond to the users (interact with users via voice recognition and voice synthesis, with the swimmers and other family members) as needed.

To perform these functions, they have safety warning module 143, emergency/accident module 145 and music/warnings delivery module 147. The safety warning module 143, emergency/accident module 145 and music/warnings delivery module 147 also interact with intermediate tiered, tier 1-2 pool control and services 161 to perform the above-said functions. The tier 1-2 pool control and services 161 can be everyday household devices such as personal/laptop computers 169, smartphones or custom-built handheld devices 173 and/or custom-built devices 171 that incorporate a pluggable and detachable processing unit (or brain unit). These devices 169, 171, 173 contain safety warning support module 163, emergency/accident support module 165 and music control and services module 167.

When the firmware or software related to the tier 0-2 pool mobile units 141 (lower tiered) cannot all by themselves complete a task, they seek assistance from the tier 1-2 pool control and services 161 (intermediate tiered) and complete the task in that way. For example, if safety warnings module 143 cannot complete a task that requires heating of the pool during winter, it may request safety warnings support module 163, which in turn controls heating of the pool. At the same time, the safety warnings module 143, via speakers of music/warnings delivery module 145, warns the people before they dive into the pool that water is too cold for swimming and that water is getting heated up. Similarly, emergency/accident module 145 takes assistance from the emergency/accident support module 165 and music/warnings delivery 147 takes assistance from the music control and services 167.

Both the tier 0-2 pool mobile units 141 and tier 1-2 pool control and services 161 interact with tier 3 user and manufacturer app/applet code and services systems (a cloud based central support and services server system) 111, whenever need arises for completion of a task or when a task is initiated by the latter. For example, if a swimmer requests a submersible pool mobile unit 155 for specific song/music, or specific swim related assistance, or weather predictions and if such a request cannot be fulfilled by either tier 0-2 pool mobile units 141 and tier 1-2 pool control and services 161, then they forward the request to the tier 3 user and manufacturer app/applet code and services systems 111. In return, the tier 3 user and manufacturer app/applet code and services systems 111 provide support and assistance for the request and the swimmer gets his or her song/music, swim related assistance or weather predictions, all within few seconds. For this, the tier 3 user and manufacturer app/applet code and services systems 111 make use of music rendering and support 133, artificial intelligence engines 119, user/app command interface 115 and operational control support 113, in totality.

In general, the tier 3 user and manufacturer app/applet code and services systems 111 consists of operational control support 113, user/app command interface 115, artificial intelligence engines 119 and sensor processing support 121. The user/app command interface 115 in turn consists of voice recognition and synthesis 117, and the sensor processing support 121 consists of video, security, recognition, etc. module 123. The voice recognition and synthesis 117 does one important function, that of recognizing the swimmer and authenticate him or her, whether they are authorized to use the pool or not. Similarly, the tier 3 user and manufacturer app/applet code and services systems 111 can also identify faces to perform the same function.

Furthermore, the tier 3 user and manufacturer app/applet code and services systems 111 also contain pool mobile units 141 specific functionalities, that include central security, support and services 125. The central security, support and services 125 in turn consists of many modules that assist the tier 0-2 pool mobile units 141 and tier 1-2 pool control and services 161, they include safety support and services 127, emergency handling support 129, accident support and services 131 and music rendering and support 133.

The music rendering and support 133 controls and provides support to the tier 0-2 pool mobile units 141 for all music related task completions, that include music selection and delivery (based upon the swimmers in the pool, after identifying the swimmers via face or voice recognition). The accident support and services 131 provides accident related support such as identifying type of accident, determining the cause of accident, identifying the swimmer(s) or others getting hurt, seriousness of the hurting and informing people inside the home as well as authorities outside the home (by utilizing the voice synthesis facility of voice recognition and synthesis 117, for example). Similarly, the emergency handling support 129 allows the swimmers and bystanders to get emergency assistance such as informing them about first aid kits (where they are available and how to use them). The safety support and services 127 provides warnings to the swimmers, such as an impending weather related emergency or the fact that a bystander is too close to the pool edge and so forth.

The pool mobile units 141 (such as those on surface or submerged, submersible pool mobile unit 155 for example) perform many additional tasks such as draining water from the pool, providing chemical treatment to the pool water etc. These are time specific and other restrictions may also apply. For example, providing chemical treatment (by pool mobile units 141) during bright sunlight often leads to higher incidence of unwanted chemical reactions. Moreover, providing chemical treatment during bright sunlight would be more likely to expose in pool goer's to treatment chemical concentrations. Such submersible pool mobile unit 155 uses dimensioned 3D mapping to identify objects at the bottom of pools and can characterize them. The submersible pool mobile unit 155 also identifies humans or pets in need of assistance and call to alert a user. Moreover, they measure exact water volume by dimensioning the pool, measure lumen production of the sun, temperature, chemical content of the pool water, evaluate water clarity, count lifeform concentrations, identify leaves and other objects. Also, from much of this information, the submersible pool mobile unit 155 generates a schedule for servicing and maintaining the pool and supporting pool area safety. In addition, the pool mobile unit can deploy an airbag and move itself and the airbag into range of a struggling swimmer and act as a buoy, then moves the swimmer to the pool edge safely. Alternatively, in one configuration, the submersible pool mobile unit 155 inflates itself under the swimmer and moves toward the edge of the pool or toward shallow end.

Generally speaking, the submersible pool mobile unit 155 rescues by one of three ways, by: a) releasing a floatation device close to swimmer; b) releasing a flotation device and dragging swimmer to edge; and c) inflating itself and approaching swimmer so that swimmer can hang on while propellers propel bot to edge and shallow side.

The submersible pool mobile unit 155 that is configured to be used as a pool robot (or bot) performs lifesaving actions when it determines that a swimmer, such as a child, is unable to swim properly and is drowning. For example, it deploys an inflated pad or an inflated life preserver jacket right below or in proximity to the swimmer, when it detects that the swimmer is in danger. Thus, every pool can deploy this submersible pool mobile unit 155 that acts primarily as an underwater cleaning bot, that also watches swimmers to make sure they are safe, and deploys an inflation portion that can be grabbed by the swimmer when it detects that the swimmer is in danger or needs help. It also communicates notification messages to alert other people in vicinity, and also optionally contacts the police or emergency services to seek help. In a related configuration, the submersible pool mobile unit 155 saves lives by pulling a swimmer's body to a shallow pool side. It can be configured to float up just under the struggling swimmer too and can keep swimming back to help them, then even encircle and pull them to shallow end of the pool and elevate a head of the swimmer in danger.

Moreover, the submersible pool mobile unit 155 can take images and videos when commanded by the users, from under water or on the surface of water or from the edges of the pool. For example, the user can command the submersible pool mobile unit 155, such as, children saying "mobile unit, go under water, to east corner and take video of us playing . . . ," and the submersible pool mobile unit 155 recognizes the voice and responds to the command immediately. The submersible pool mobile unit 155 also performs a plurality of additional secondary duties, such as detecting cracks on the bottom and wall surfaces, detecting temperature of water and the water composition (for example, chlorine content, blood in case of an emergency or accident, other chemical agents). It also informs the swimmers and family members, when there are any abnormalities in the environment of water and air.

If the submersible pool mobile unit 155 spots and identifies animals in the pool, it pushes them to safe territories/sections of the pool. The submersible pool mobile unit 155 spots leaves and debris and collects them and removes them before they begin decaying. It spots items such as glasses, rings and toys at the bottom of the pool and alerts a user for pickup if it cannot handle the pickup. In a related configuration, the submersible pool mobile unit 155 recognizes/identifies screaming humans and children flailing, or recognizes strangely floating conditions of people that appear wrong and takes safety actions, communicating information to help the swimmer. It can detect bumps on heads of swimmers, or detect blood patterns in the water and send out alerts/notifications to warn others and to call for help. The submersible pool mobile unit 155 can also speak instructions to bystanders and those running to find help. In a related embodiment, it facilitates conducting cardiopulmonary resuscitation (CPR) by providing air/oxygen that is pumped into the lungs of a swimmer in distress (or one who has been recovered out of the swimming pool).

Thus, the submersible pool mobile unit 155, while sitting and watching pool chemistry and filtering, actively watches people swimming, while in watch mode. It counts seconds for durations of underwater heads and similar diving activities conducted by a swimmer, knowing that long durations are not possible by humans or animals. It can detect when a swimmer is floating face down in the water for too long.

The submersible pool mobile unit 155 is assembled and/or configured and reconfigured to carry a multitude of several different sensors. The following are some sensors and detection and identification elements whose usage and incorporation is anticipated: a) proximity, range, tilt, motion, accelerometer, compass, gyroscope, GPS; b) rain, snow, temperature, ice, mud; c) ultrasonic; d) acoustic wave; e) infrared (IR); f) ultraviolet; g) multi-microphone; h) barometer; i) smoke, radon, radiation, CO2, carbon monoxide; j) pollen counter; k) video/imager—plus face recognition/detection, human body, pet, objects; l) lumen/ambient light; m) spectrum analyzer; n) PH; o) alkalinity; p) detection and dispensing—chlorine (to disinfect and sanitize pool and other water—kills algae and bacteria) and cyanuric acid (to protect chlorine from UV); q) bacteria, fungus, virus detection and identification; r) algae, microbe detection and identification; and s) 3D depth sensing and dimensioning.

Furthermore, the pool mobile unit 141 is fitted with emitters of different kinds, some of them incorporated by default based on the tasks to be performed by it and the environment it is to be used, while other emitters are plugged in or added by the user for specific tasks. The following are some of the emitter modules: a) flash, spot, headlamps, area lighting as needed by the pool mobile unit 141 sensors or by humans; b) micro-projector; c) IR to support ranging and Google Tango® type 3D mapping for better sensory imager pickup even at night or with lights off or dim; d) UV lamps to disinfect or kill microbes, bacteria and render viruses harmless.

The communication between the tier 0-2 pool mobile units 141 and tier 1-2 pool control and services 161 occur mainly wirelessly (via Wi-Fi or Bluetooth®), because wires can entangle them (or swimmers and bystanders) and cause hazards. Nonetheless, the communication between both the tier 0-2 pool mobile units 141 and tier 1-2 pool control and services 161 and the tier 3 user and manufacturer app/applet code and services systems 111 occurs via communication networks 191, that includes internet, intranet and household wired or wireless communication networks.

It should be clear that the mobile unit modelled after the tier 0-2 pool mobile units 141 takes many forms, such as a boat, a yacht, a submersible, and a semi-robotic or robotic water vehicle. For example, the pool mobile units 141 is anything that is robotic, mobile designed to be used in water, that is capable of data collection and sharing in accordance with the present invention.

In one configuration, by analyzing the current position of a swimmer in a pool area, and factoring in the age, style and experience of the swimmer, and incorporating the depth of the pool into an ongoing safety analysis, a warning message or an advice is provided by a Tier 1-2 pool control & services 161 (for example, incorporated as a safety monitoring system, built in accordance with the present disclosure) supporting a swimming pool area to the swimmer as appropriate. For example, a warning message, using the safety warnings support 163, can be "Stay away from the deep side of the pool". Similarly, an advice can be "Stay closer to the edge while you swim", etc.

In one configuration, by analyzing the current position of a swimmer in a pool area, and factoring in the age, style and experience of the swimmer, and incorporating the depth of the pool into an ongoing safety analysis, a warning message or an advice is provided by a Tier 0-2 pool mobile units 141 (for example, incorporated as the submersible pool mobile unit 155, built in accordance with the present disclosure) supporting a swimming pool area to the swimmer as appropriate. For example, a warning message, using the safety warnings module 143, can be "Stay away from the deep side of the pool". Similarly, an advice can be "Stay closer to the edge while you swim", etc.

Figure 2:
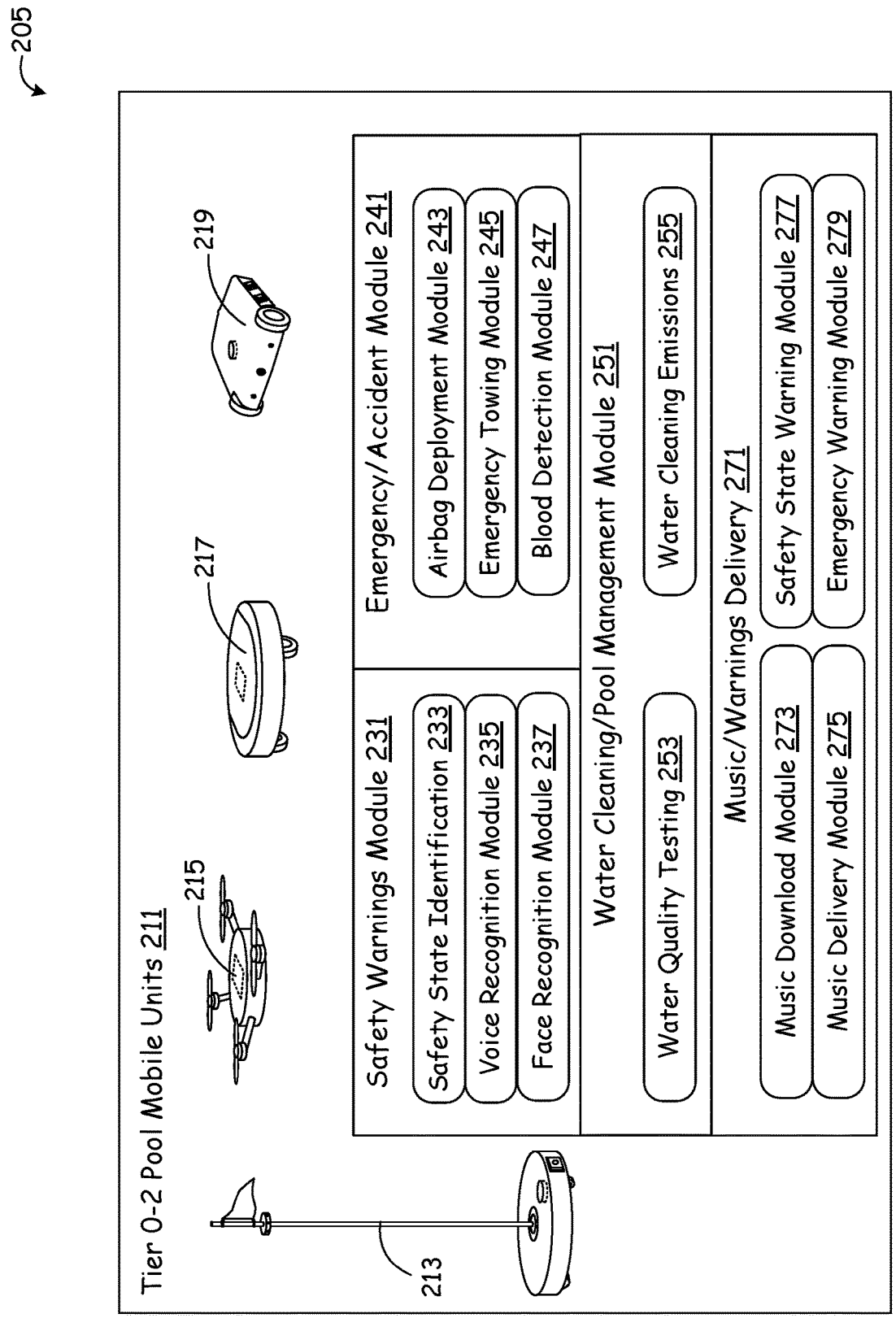
FIG. 2 is a perspective block diagram illustrating tier 0-2 pool mobile units of FIG. 1, in detail.

FIG. 2 is a perspective block diagram illustrating tier 0-2 pool mobile units of FIG. 1, in detail. Many varieties of pool mobile units 211 are configured, they include flag pole pool mobile unit 213, drone pool mobile unit 215, general purpose pool mobile unit 217 and submersible pool mobile unit 219. They are designed to meet many different and specific goals. All of the pool mobile units 211 perform few primary functions such as managing the pool and safeguarding the swimmers and bystanders, while also perform many secondary functions, including taking images and video (and sending them to the cloud) and providing swimmer's favorite music (via built-in speakers or external speakers placed next to the pool).

The flag pole pool mobile unit 213 has a tall pole (in a related configuration, a telescoping pole) containing a camera at the top of it and a processing unit (brain unit) and memory at the bottom. Many other sensors, such as microphones, are also built-in at the bottom or on the pole. The flag pole pool mobile unit 213 is connected to the cloud and has a good camera visibility to watch over the entire area in which the pool also exists. It has wheels and wanders around the pool, while performing its primary and secondary functions. The drone pool mobile unit 215 has the bot capabilities and is typically employed as a supplementary pool mobile unit. It has a good visibility with its telescopic camera and can move around entire pool area. Upon pressed into service by a primary pool mobile unit such as the 217, it moves closer to the swimmer or bystander who is in trouble (in emergency or accident situations) and provides images of the area, and also provides instructions and warnings to them. It also has capability to deliver music and video, such as a television coverage of an important event or breaking news, from the bottom side of it. It can also perform both primary and secondary functions on its own, without a primary pool mobile unit 211 present in the pool or pool area. The general purpose pool mobile unit 217, as the name suggests, fulfills its primary and secondary functions by wandering either by the edges of the pool or on the surface of the pool. The functionalities of the submersible pool mobile unit 219 is explained in detail with reference to the FIG. 1 (the submersible pool mobile unit 155 of FIG. 1).

The tier 0-2 pool mobile unit 211, to perform the above said functionalities, consists of safety warning module 231, emergency/accident module 241, water cleaning/pool management module 251 and music/warnings delivery module 271. The flag pole pool mobile unit 213, drone pool mobile unit 215, general purpose pool mobile unit 217 and submersible pool mobile unit 219, depending on their primary and secondary functionalities, consists of at least some of the above-mentioned modules 231, 241, 251 and 271 or their submodules.

The submodules of safety warnings module 231 include safety state identification 233, voice recognition module 235 and face recognition module 237. The safety state identification module 233 identifies circumstances (or states) of the present time, so that it can initiate a task toward issuing safety warnings to the swimmers or bystanders and initiate processes that involve higher tiered entities such as pool control and services 161 (of FIG. 1) and tier 3 user and manufacturer app/applet code and services systems 111 (of FIG. 1). For example, a child may have jumped into the deep end of the pool and this is a state in which the safety warnings module 231 issues warning to the child, other swimmers close by and bystanders, and loudly announces: "Robert is not authorized enter deep end of the pool, quickly get out of the pool . . . " The voice recognition module 235 and face recognition module 237 identify the voices and faces of different people in the pool and around the pool, so that the safety warnings module 231 can initiate tasks associated with each one around in a personalized manner. In the above-mentioned example, the voice recognition module 235 and face recognition module 237 identify the name Robert based on voice and face recognition.

The emergency/accident module 241 consists of airbag deployment module 243, emergency towing module 245 and blood detection module 247. The airbag deployment module 243 initiates a task of deploying the airbag, as soon as it identifies that the swimmer is in trouble and requires assistance for swimming. Similarly, emergency towing module 245 initiates a task of towing the swimmer to shallow end or even out of the pool, once the pool mobile unit 211 identifies that the swimmer is holding on to the airbag. The blood detection module 247 identifies blood in water and initiates tasks to address various emergency situations.

Furthermore, the submodules of water cleaning/pool management module 251 include water quality testing 253 and water cleaning emissions 255. Some of these functionalities of modules 253 and 255 are possible only by on the surface or submersible pool mobile units (155 of the FIG. 1). Similarly, the submodules of music/warnings delivery module 271 are made up of music download module 273, music delivery module 275, safety state warning module 277 and emergency warning module 279. The music download module 273 downloads music from higher tiered units, depending upon the interests of the individual swimmers and even bystanders, either upon their requests or otherwise. The music delivery module 275 delivers music to the swimmers and bystanders on the pool mobile unit's 211 built-in speakers or separate speakers kept in the vicinity.

Figure 3:
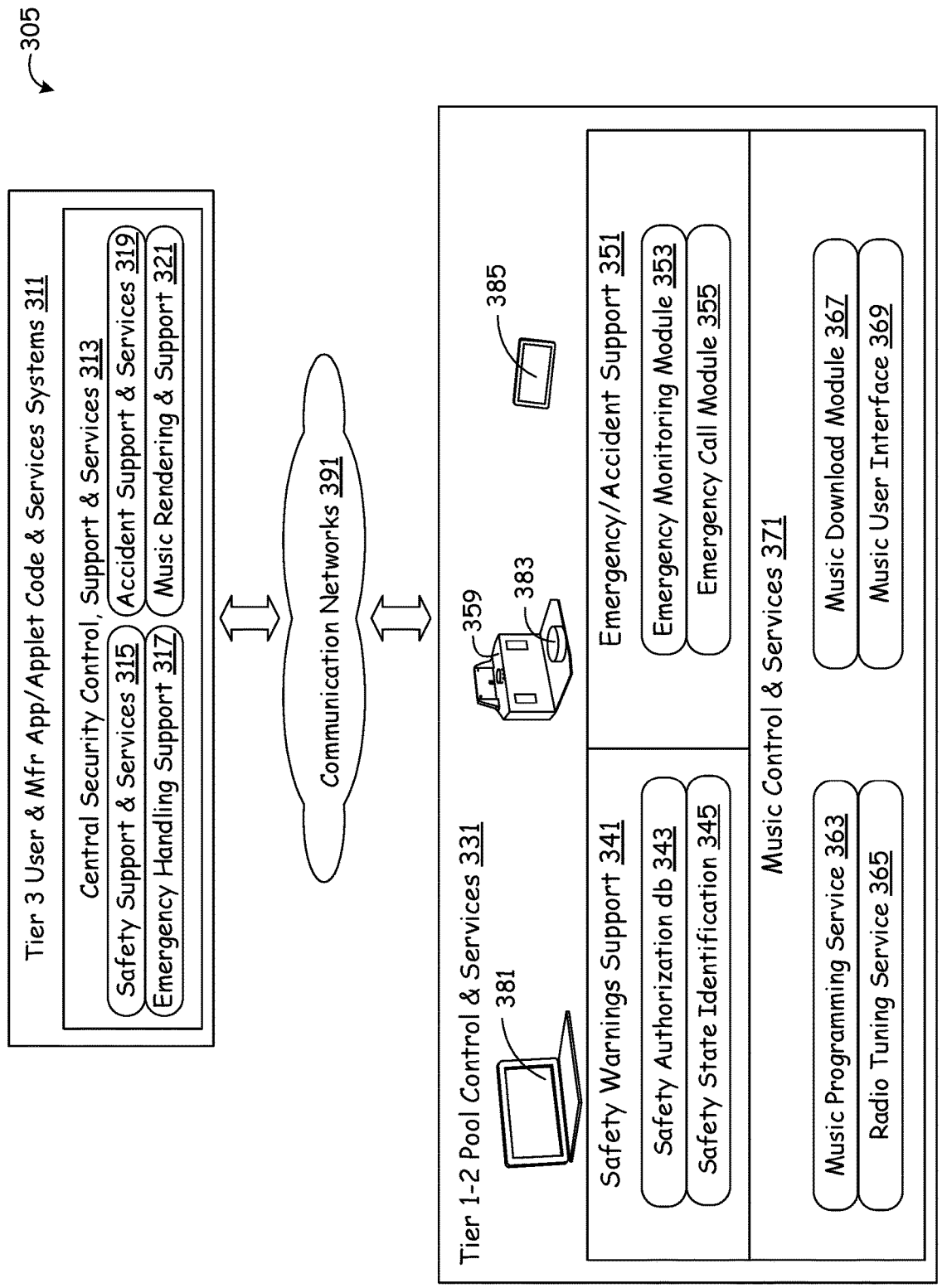
FIG. 3 is a perspective block diagram illustrating tier 1-2 pool control and services of FIG. 1, in detail.

FIG. 3 is a perspective block diagram illustrating tier 1-2 pool control and services of FIG. 1, in detail. These intermediate tiered control and management units (tier 1-2 pool control and services 331) include laptop or personal computers 381, custom built pool control and management systems 359 (with a pluggable and detachable processing or brain unit 383) and smartphones (or similar looking custom built pool control and management systems) 385. These tier 1-2 pool control and services 331 have user interfaces that allow the users to access data contents and management controls of the tier 0-2 pool mobile units 141 (of FIG. 1) and the tier 3 user and manufacturer app/applet code and services systems 111 (of FIG. 1). The user may, for example, input the pool temperature to be set at certain temperature, upon arrival of some specific swimmer or at a particular time. Keeping the pool heated all the time is waste of energy, for that matter.

The tier 1-2 pool control and services 331 consists of safety warnings support 341, emergency/accident support 351 and music control and services 371. The safety warnings support 341 in turn consists of safety authorization database 343 and safety state identification 345. The safety authorization database 343 contains names, priorities and health conditions of all the users of the pool, so that both the general and swimmer specific safety warnings can be generated and delivered to the tier 0-2 pool mobile units (141 of FIG. 1). The safety state identification 345 supports and assists the functionalities of the tier 0-2 pool mobile units (141 of FIG. 1).

The emergency/accident support 351 consists of emergency monitoring module 353 and emergency call module 355. The emergency monitoring module 353 gathers sensor data from the tier 0-2 pool mobile units (141 of FIG. 1), such as images and videos, "help me . . . " or other similar emergency calls and noises for help via microphones, etc. and determines when a true emergency situation occurs, so that appropriate actions can be taken. The emergency call module 355 initiates calls to various authorities as well as family members (when they are on vacation, for example).

The music control and services 371, probably is the most active module for all the times since other modules get activated only during specific situations. Its submodules include music programming service 363, radio tuning service 365, music download module 367 and music user interface 369. The music programming service 363 and radio tuning service 365 allow the users to set their favorite music and radio stations, respectively. The music download module 367 downloads music from various online sources, as directed by the users, including tier 3 user and manufacturer app/applet code and services systems 311, by setting up accounts with them and paying money automatically. The music user interface 369 allows the users to configure the laptop or personal computers 381, custom built pool control and management systems 359 or smartphones 385, as well as the tier 0-2 pool mobile units 141 (of FIG. 1) and tier 3 user and manufacturer app/applet code and services systems 111 (of FIG. 1), for various users (swimmers) related personalization.

The tier 3 user and manufacturer app/applet code and services systems 311 consists of central security control, support and services 313, which in turn consists of safety support and services 315, emergency handling support 317, accident support and services 319 and music rendering and support 321. They assist the tier 1-2 pool control and services 331 in a variety of ways, as explained above and with reference to the FIG. 1. The communication between both the tier 1-2 pool control and services 331 and the tier 3 user and manufacturer app/applet code and services systems 311 occurs via communication networks 391, which include internet, intranet and household wired or wireless communication networks.

Figure 4:
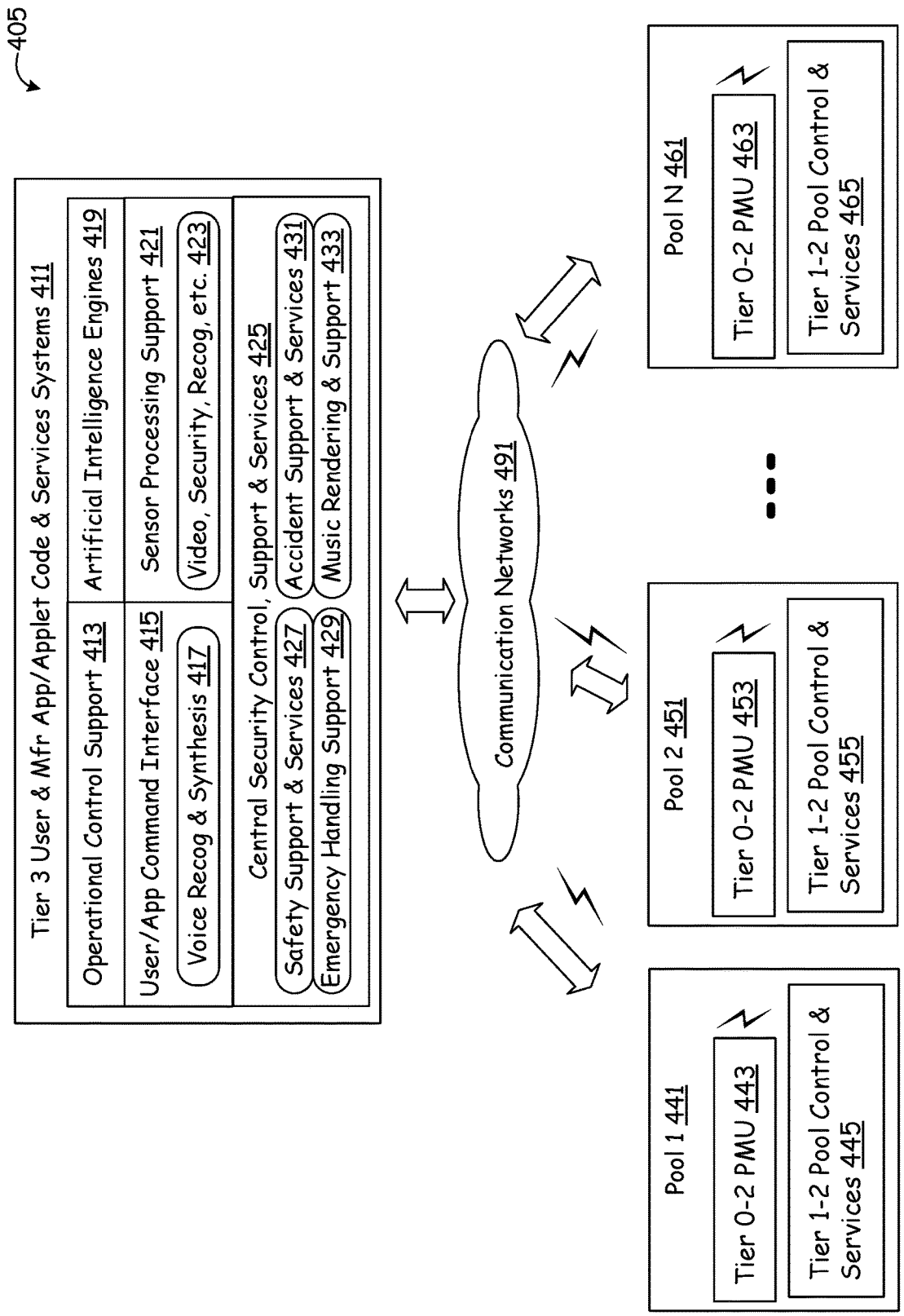
FIG. 4 is a perspective block diagram illustrating the pool mobile unit infrastructure, wherein a tier 3 cloud system manages a plurality of swimming pools, by managing pool mobile units residing there, at the same time.

FIG. 4 is a perspective block diagram illustrating the pool mobile unit infrastructure 405, wherein a tier 3 cloud system manages a plurality of swimming pools, by managing pool mobile units residing there, at the same time. The tier 3 user and manufacturer app/applet code and services system 411 manages a plurality of tier 0-2 pool mobile units (PMU) 443, 453 and 463, while also supporting tier 1-2 pool control and services 445, 455 and 465, at swimming pools pool 1 441, pool 2 451 and pool N 461, respectively. Communication networks 491, which include any of the internet, intranet and wired and/or wireless, makes communication between the tier 3 user and manufacturer app/applet code and services system 411 and pool mobile units 443, 453 and 463, and pool control and services 445, 455 and 465 possible.

The tier 3 user and manufacturer app/applet code and services systems 411 provide control, support and services for the pool mobile units 443, 453 and 463 and pool control and services 445, 455 and 465 via operational control support 413, user/app command interface 415, artificial intelligence engines 419, sensor processing support 421 and central security control, support and services 425.

The user/app command interface 415 in turn contains voice recognition and synthesis 417, and the sensor processing support 421 consists of video, security, recognition, etc. module 423. The voice recognition and synthesis 417 makes recognizing the individual swimmer and authenticating him or her possible as well. Moreover, the tier 3 user and manufacturer app/applet code and services systems 411 also contain central security, support and services 425. The central security, support and services 425 contains safety support and services 427, emergency handling support 429, accident support and services 431 and music rendering and support 433.

For example, the manufacturer of the pool mobile units 443, 453 and 463 may set up a server 411 at few regions of the world, and the users of the 443, 453 and 463 are requested to buy the pool control and services 445, 455 and 465 units, either by downloading them or purchasing them right away. Furthermore, the manufacturer may request the users to register with the server 411, via the pool control and services 445, 455 and 465 units and configure both their pool mobile units 443, 453 and 463 and accounts at the server 411. Once the configuration is set up, the pool mobile units 443, 453 and 463, pool control and services 445, 455 and 465 units as well as the server 411 gain experiences of the users who use the pools (swimmers) pool 1 441, pool 2 451 and pool N 461, respectively. The tier 3 user and manufacturer app/applet code and services systems 411 also contain databases (not shown) to store and utilize user preferences as well as the learnt experiences of the users. These data parameters gained over prolonged uses allow the entire infrastructure 405 to anticipate events and provide individual swimmer and bystander (entire family, in general) based safety, emergency/accident, music, pool cleaning and management and other supports.

Figure 5:
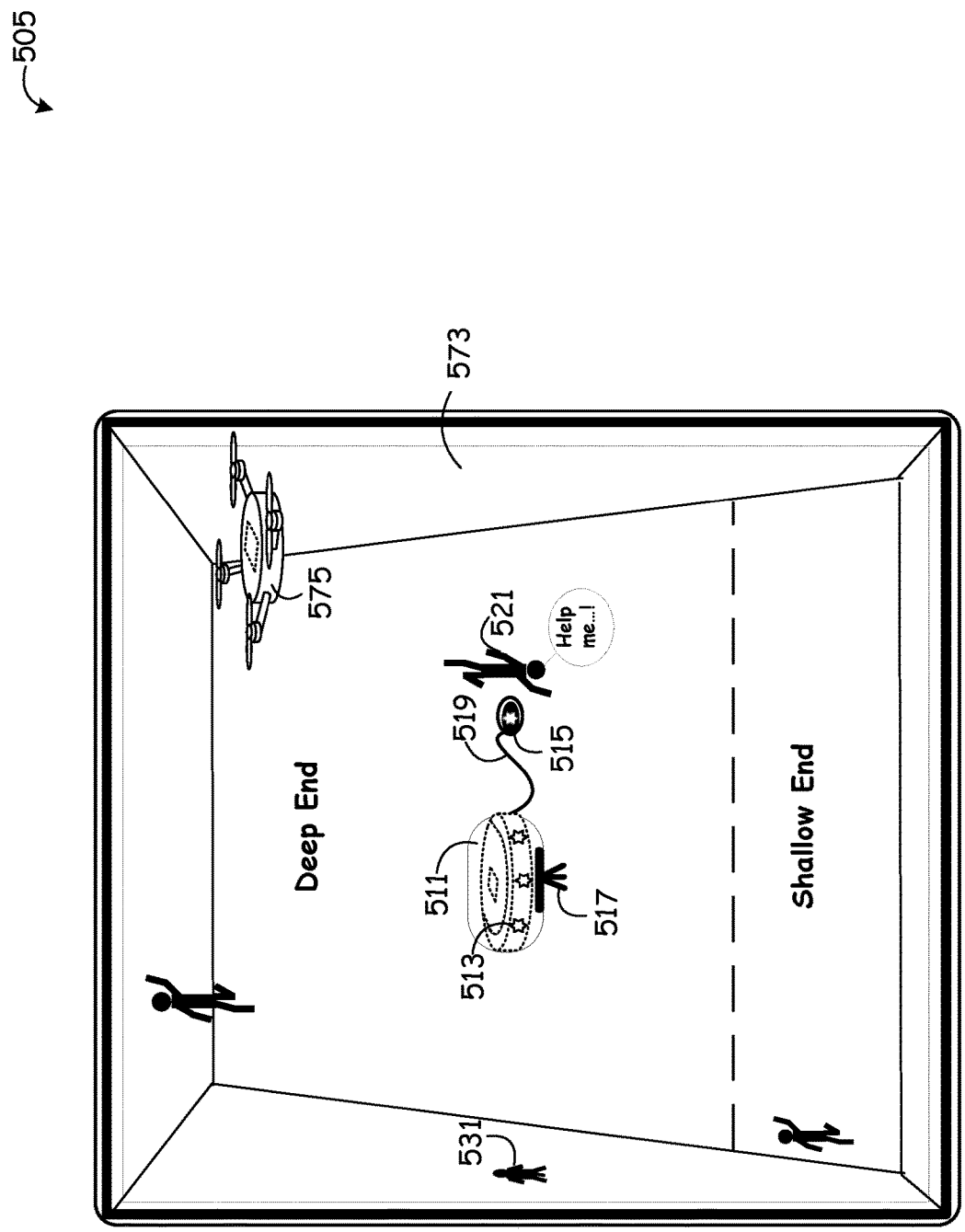
FIG. 5 is a perspective block diagram illustrating functionalities of an exemplary pool mobile unit when placed in a swimming pool, wherein the pool mobile unit assists a swimmer in an emergency situation.

FIG. 5 is a perspective block diagram illustrating functionalities of an exemplary pool mobile unit 511 when placed in a swimming pool 573, wherein the pool mobile unit 511 assists a swimmer 521 in an emergency situation. The swimming pool 573 illustrated could be a pool in the backyard of a typical house, having a slope at the bottom with a shallow end at one side and deep end at another. The illustration depicts three swimmers of a family or their friends, along with their entire history of interactions at the swimming pool and with a history of illnesses and weaknesses being stored at the cloud system databases. This data (at the databases) of individual swimmers is helpful in generating the right kind of responses for every type of safety related or emergency/accident situation, also to deliver music of their liking, and personalize the pool mobile unit infrastructure 505 in other ways. The illustration also depicts a pet 531 fallen in the water.

When one of the family members 521 finds it hard to breath and hence to swim, because of an illness (such as epilepsy or allergy), for example, the pool mobile unit's 511 microphone (depicted in the sensor and emitter panel 513) picks up the "help me . . . " cry for help and its camera picks up signs of difficulties while swimming.

However, the pool mobile unit 511 may not be equipped with a processing capability (as is the case with some of the simpler pool mobile units 511, by design) when it senses signs of difficulties while swimming. In such a scenario, the tier 1-2 pool control and services 161 (of FIG. 1) or tier 3 user and manufacturer app/applet code and services 111 (of FIG. 1), soon as they receive these sensed difficulties while swimming, begin to process them and an emergency related task is initiated.

In any case, the pool mobile unit 511, having propellers 517 for movement or mobility, after the emergency task is initiated, quickly moves toward the struggling family member 521 and releases tethered 519 airbag 515 toward the family member 521. Once the family member 521 securely holds onto the airbag, the pool mobile unit 511 slowly moves toward the shallow end or edge of the pool 573. At the same time, depending upon the swimming experience and illness history of the family member 521, the pool mobile unit 511, along with the tier 1-2 pool control and services 161 (of FIG. 1) or tier 3 user and manufacturer app/applet code and services 111 (of FIG. 1), initiates tasks to inform family members by loudly alerting the fact that the family member 521 being in danger, such as "Robert is suffering from an allergy attack, he is being pulled toward the shallow end, please come and assist him, please do the following . . . " In addition, depending upon the seriousness of the condition, the pool mobile unit 511 informs the hospital where he had been treated before.

In all these situations, the pool mobile unit 511 may also summon the assistance of a drone 575. The drone 575, in one embodiment, is the first one to identify the struggling swimmer 521 and inform the pool mobile unit 511 and initiate emergency related task. Finally, in a related embodiment, the pool mobile unit 511 also identifies pets 531 fallen in the pool and pushes the pet 531 away toward the pool 573 edge, if it picks up signs of an emergency.

Figure 6:
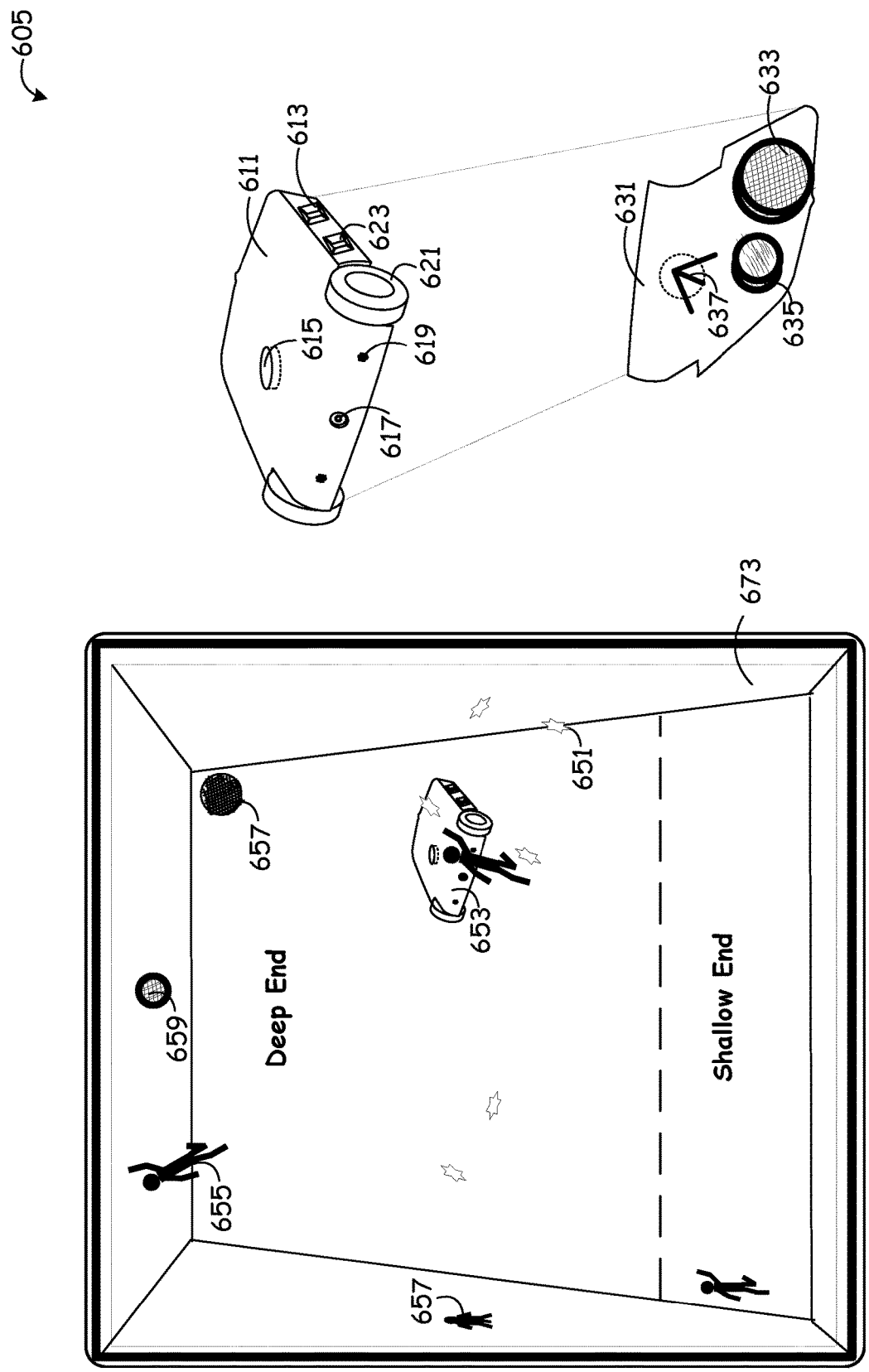
FIG. 6 is a perspective block diagram illustrating functionalities of an exemplary pool mobile unit when placed in a swimming pool, wherein the pool mobile unit scrubs and cleans the swimming pool, removes fallen leaves and other objects, controls the recycling of water and emission of cleaning agents, and performs everyday management related chores.

FIG. 6 is a perspective block diagram illustrating functionalities of an exemplary pool mobile unit when placed in a swimming pool 605, wherein the pool mobile unit scrubs and cleans the swimming pool, removes fallen leaves and other objects, controls the recycling of water and emission of cleaning agents, and performs everyday management related chores. During the times when the swimming pool 673 is not in use, the submersible pool mobile unit 653 propels to the bottom of the pool 673, and scrubs and cleans the bottom surface of the pool 673. Even during the times when pool 673 is in use, but no emergency task is initiated, the submersible pool mobile unit 653 cleans the bottom surface (as depicted in the figure) and walls of the pool 673.

In one configuration, the submersible pool mobile unit 653 performs a plurality of secondary tasks of mundane pool 673 management, such as: a) removing fallen leaves and other objects both on the surface and at the bottom of the pool 673; b) picking up valuables from the bottom of the pool 673, or alerting the swimmers and family members about the fallen valuable; c) draining or recycling the pool 673 water once in a while, via the water outlet 657 and inlet 659, by electronically controlling the valves, during unused times such as during the night; d) emitting chlorine and other chemical agents into the pool 673 water, to get rid of disease causing microbes; e) scrubbing and cleaning the bottom and side surfaces of the pool 673, to remove settled dirt and fungus; and so forth.

The submersible pool mobile unit 653 also does primary tasks such as monitoring the swimmers 655, bystanders and pets 657. The submersible pool mobile unit 653 also contains airbag for emergencies and can deploy it in an emergency. Its primary functions include delivering safety warnings/music and attending emergency and accident circumstances. The submersible pool mobile unit 653 also takes images and videos both under water and on the surface, when requested.

To perform the abovementioned tasks, the submersible pool mobile unit 611 contains a pluggable and detachable processing unit (or brain unit) 615, chlorine and other chemical cleaning agent emitters 613, speakers 623, microphones and other sensors 619 and flash light and video camera 617. In one configuration, the submersible pool mobile unit 611 also contains wheels 621 to be able to move on the bottom surface of the pool 673. At the bottom side 631 of the submersible pool mobile unit 611, there are propellers 637 (to move on the surface of and under the water), scrubber 635 and vacuuming suction hole 633. The submersible pool mobile unit 653 is designed to be mobile under the water. The entire submersible pool mobile unit 653 is sealed hermetically, except the wheels 621, propellers 637, scrubbers 635 and some emitters 613, 623.

Figure 7:
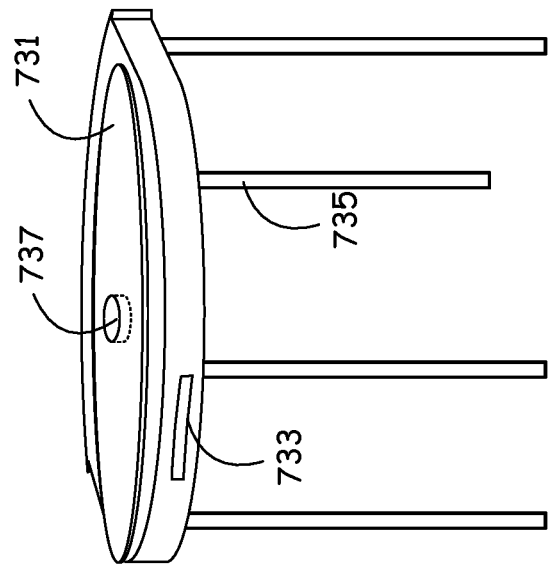
FIG. 7 is a schematic diagram illustrating constructional details of an exemplary pool mobile unit of the FIG. 1.
Figure 7:
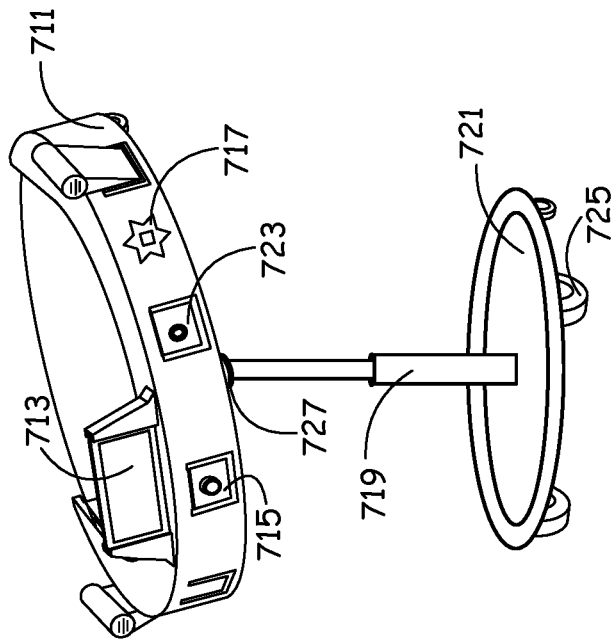

FIG. 7 is a schematic diagram illustrating constructional details 705 of an exemplary pool mobile unit of the FIG. 1. Hardware of the pool mobile unit 711 is configured to meet certain requirements of a poolside mobile unit. The pool mobile unit 711 moves around the pool, all the while observing the swimmers and family members, and raises a flag (initiating a relevant task) when it sees any developments that are out of the ordinary and takes relevant actions. In order to take these actions, the pool mobile unit 711 utilizes the experiences (programming, configuration and learnt knowledge, combined) of the entire system, that includes experiences of the tier 1-2 pool control and services 161 (of FIG. 1), tier 3 user and manufacturer app/applet code and services 111 (of FIG. 1) and the pool mobile unit 711 itself.

In general, there are two hardware entities to the construction of a poolside mobile unit. They are, the pool mobile unit 711 itself, and a docking system 731 that not only charges the batteries of the pool mobile unit 711 but also acts as the tier 1-2 pool control and services 731 (or, 161 of FIG. 1). All communication from and to the pool mobile unit 711 pass through tier 1-2 pool control and services 731, and many of the actions are carried out by the processing of the tier 1-2 pool control and services 731 as well. The depiction shows construction of both the pool mobile unit 711 and tier 1-2 pool control and services 731.

The pool mobile unit 711 has a base 721 with motorized wheels 725 at the bottom side. This allows the pool mobile unit 711 to wander around freely, by the walls of the pool. It has a motorized telescopic leg 719, that allows the height of the pool mobile unit 711 to be adjusted. This is an automatic process, wherein the pool mobile unit 711 adjusts its own height for better visibility of an area it is trying to observe. Furthermore, there is an automatic rotation and tilting mechanism 727, that allows the pool mobile unit 711 tilt by its sides and also rotate 360 degrees. The depiction shows a slightly tilted pool mobile unit 711.

In addition, the pool mobile unit 711 has a pluggable and detachable processing unit (brain unit) 713, that in conjunction with the tier 1-2 pool control and services' 731 processing unit (brain unit) 737 perform most of the tasks, in everyday circumstances. Then, it also has pluggable and detachable video camera along with a flash light 715, microphone and other sensors 723 and speaker (emitters, in general) 717.

The tier 1-2 pool control and services 731 has a contactless induction charging port 733 and four legs 735. The pool mobile unit 711 and tier 1-2 pool control and services 731 are hermetically sealed for protection against elements of nature, such as water from swimming pool and rain as well as wind and dust. The pool mobile unit 711 and tier 1-2 pool control and services 731 communicate between each other via a wireless connection such as Wi-Fi or Bluetooth®.

Figure 8:
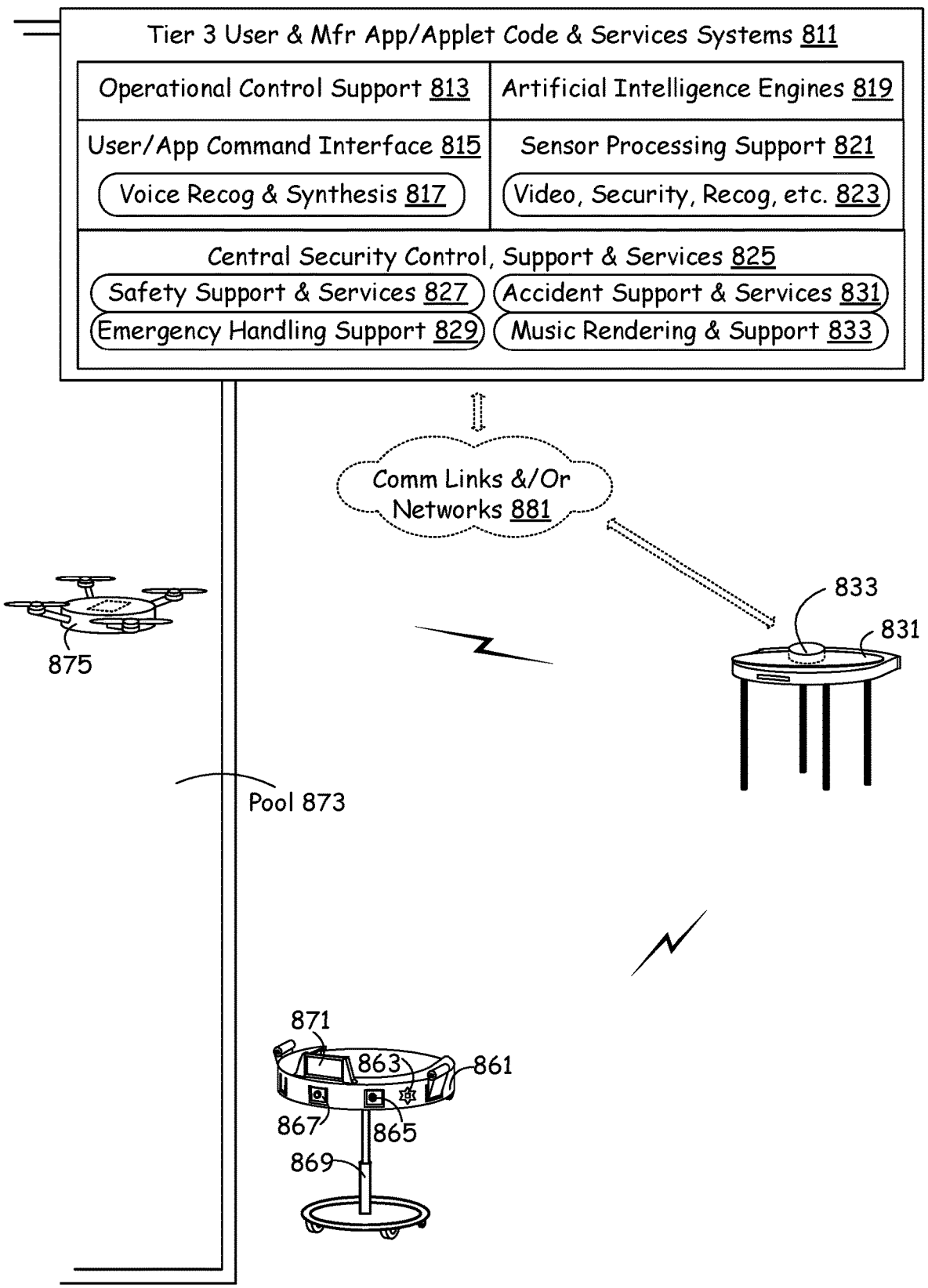
FIG. 8 is a schematic diagram illustrating an exemplary pool mobile unit of FIG. 7 in real-life everyday usage circumstances.

FIG. 8 is a schematic diagram illustrating an exemplary pool mobile unit of FIG. 7 in real-life everyday usage circumstances 805. The pool mobile unit 861 depicted is not submersible, however it wanders all around the pool 873, all the while monitoring for anything unusual that pertains to safety, emergencies and accidents. The monitoring involves a plurality of sensors, including a video camera with a flash light 867, a sensor unit 865 that includes a microphone. The sensors 867, 865, while monitoring, specifically look for voice recognition of emergency call such as a shouting "help me . . . ," raised pitch that resembles an emergency, accident and so forth. Also, sensors 867, 865 also look for safety, emergency and accident related circumstances via the camera 867, that includes sensing red color of blood and so forth.

All the information from multiple sensors 867, 865 are combined and analyzed (processed) to determine whether an unusual situation pertains to safety, emergency or accident. This processing in real-life includes not just processing unit 871 and programs of the pool mobile unit 861, but also processing unit 833 and programs of the docking system 831, that acts as a tier 1-2 pool control and services 161 (of FIG. 1) and tier 3 user and manufacturer app/applet code and services 811.

When the battery is low, the pool mobile unit 861 moves closer to the docking system 831, facing its charging coil to the charging coil of the docking system 831 for recharging. The recharging is done during idle times, mostly during night, to avoid missing any safety, emergency and accident situations.

In one embodiment of the present disclosure, the pool mobile unit 861 works to monitor safety, emergencies and accidents in conjunction with a drone 875, wherein when the monitoring from a distance becomes difficult, it summons the drone 875 to monitor the safety, emergency and accident situation from up close. The drone 875, which also contains a plurality of sensors, from up close looks for the above-mentioned signs and provides additional inputs to the docking system 831 (tier 1-2 pool control and services) and tier 3 user and manufacturer app/applet code and services 811.

The pool mobile unit 861 also consists of a motorized telescopic leg 869 for better visibility, if there are any obstructions in the view. The pool mobile unit 861, drone 875 and docking system 831 communicate between each other via a wireless connection such as Wi-Fi or Bluetooth®. The communication between the tier 1-2 pool control and services 831 and tier 3 user and manufacturer app/applet code and services 811 occurs via a communication links and/or networks 881.

The tier 3 user and manufacturer app/applet code and services systems 811 comprises operational control support 813, user/app command interface 815, artificial intelligence engines 819, sensor processing support 821 and central security control, support and services 425. The user/app command interface 815 in turn comprises voice recognition and synthesis 817, and the sensor processing support 821 comprises of video, security, recognition, etc. module 823. Moreover, the tier 3 user and manufacturer app/applet code and services systems 811 also contain central security, support and services 825. The central security, support and services 825 contains safety support and services 827, emergency handling support 829, accident support and services 831 and music rendering and support 833.

Figure 9:
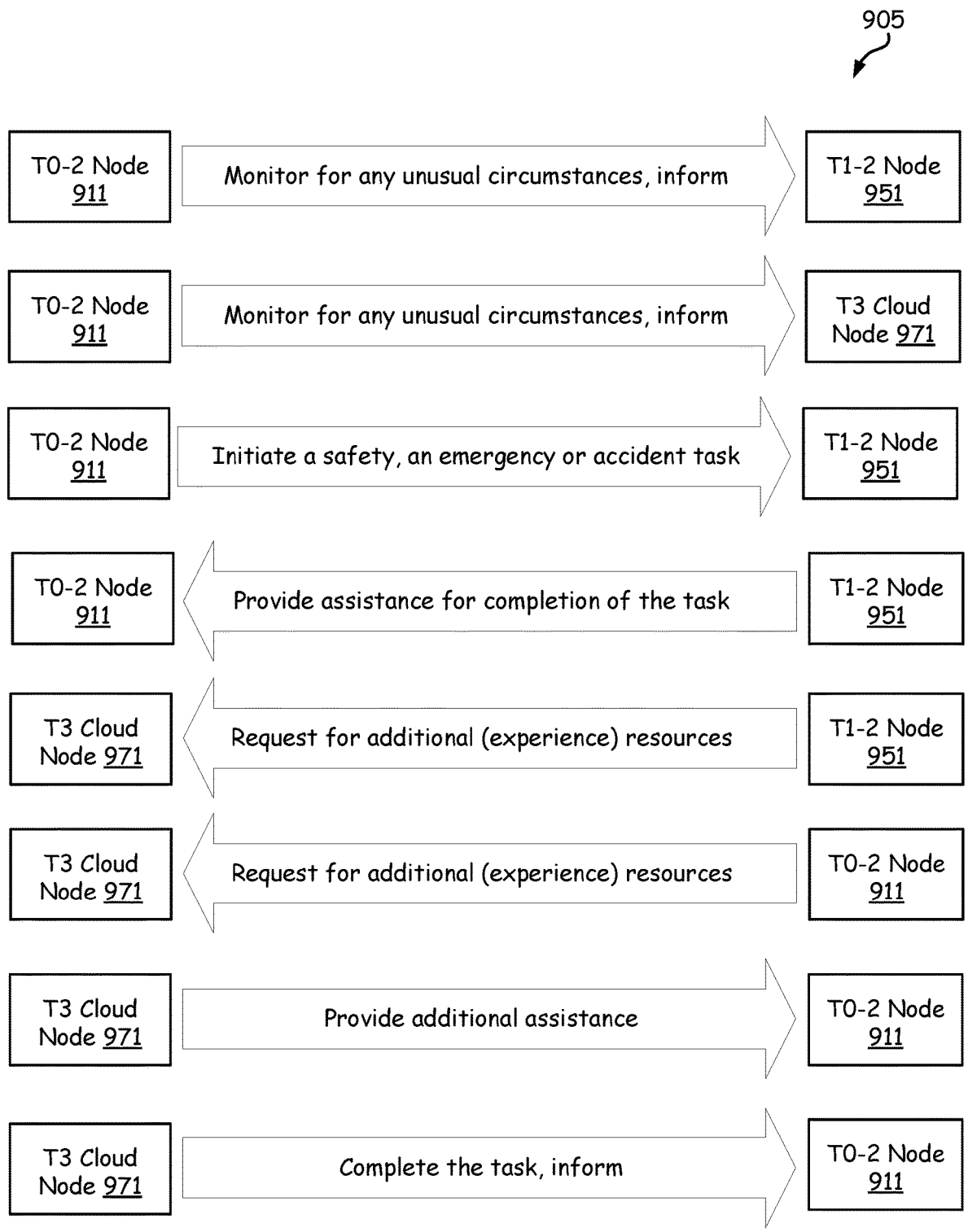
FIG. 9 is a schematic diagram illustrating the processes involved when a safety, an emergency or accident context arises within the pool mobile unit infrastructure of the FIG. 1.

FIG. 9 is a schematic diagram illustrating the processes involved 905 when a safety, an emergency or accident context arises within the pool mobile unit infrastructure of the FIG. 1. The processes begin with the T0-2 node (pool mobile unit) 911 monitoring the pool and surrounding areas for any unusual events, for which there are preset rules. When such circumstances arise (that warrants a trigger, set in terms of preset rules), the T0-2 node 911 informs both T1-2 node (tier 1-2 pool control and services of the FIGS. 1) 951 and T3 cloud node (tier 3 user and manufacturer app/applet code and services of the FIG. 1) 971.

Then, the T0-2 node 911 initiates a task that pertains to a safety, or an emergency, or accident task, and that task triggers a specific routine in T1-2 node 951. The priorities are set based on the event that raises the trigger, the safety task being a lowest priority routine, emergency task being an intermediate priority routine and accident task being the highest priority routine.

For example, slippery pool edges, because of freshly fallen rain, constitutes a safety trigger when the family members arrive near the swimming pool. An asthma attack in the swimming pool constitutes an emergency (for example, excessive chlorine in the water can trigger asthma in some people). Furthermore, by obliviousness, a child diving into the pool at a shallow end and hitting his or her head against the bottom, and getting seriously hurt that way, constitutes an accident.

Initially, for less serious cases, the T1-2 node 951 provides assistance to the T0-2 node 911 and attempts resolve the issue (without involving the T3 cloud node 971). However, if the issue is not resolved by the T1-2 node 951, either or both the T0-2 node 911 and T1-2 node 951 request for additional experiences (resources) from the T3 cloud node 971. The experiences comprise programming (which involves the programmer's experiences), user set configurations and knowledge gained by the T3 cloud node 971, put together. For example, an infrequent visitor (may be a family friend) may have fear of deep waters and wishes to swim only in the shallow end of the pool. The pool mobile unit infrastructure learns this by observing the family friend's behavior and this constitutes experience pertaining to that person. This knowledge or experience is useful during an instance of safety, emergency or accident. This experience is stored in the databases at T0-2 node 911, T1-2 node 951 and/or T3 cloud node 971. Finally, the T0-2 node 911 receives additional assistance and that completes the task.

Figure 10:
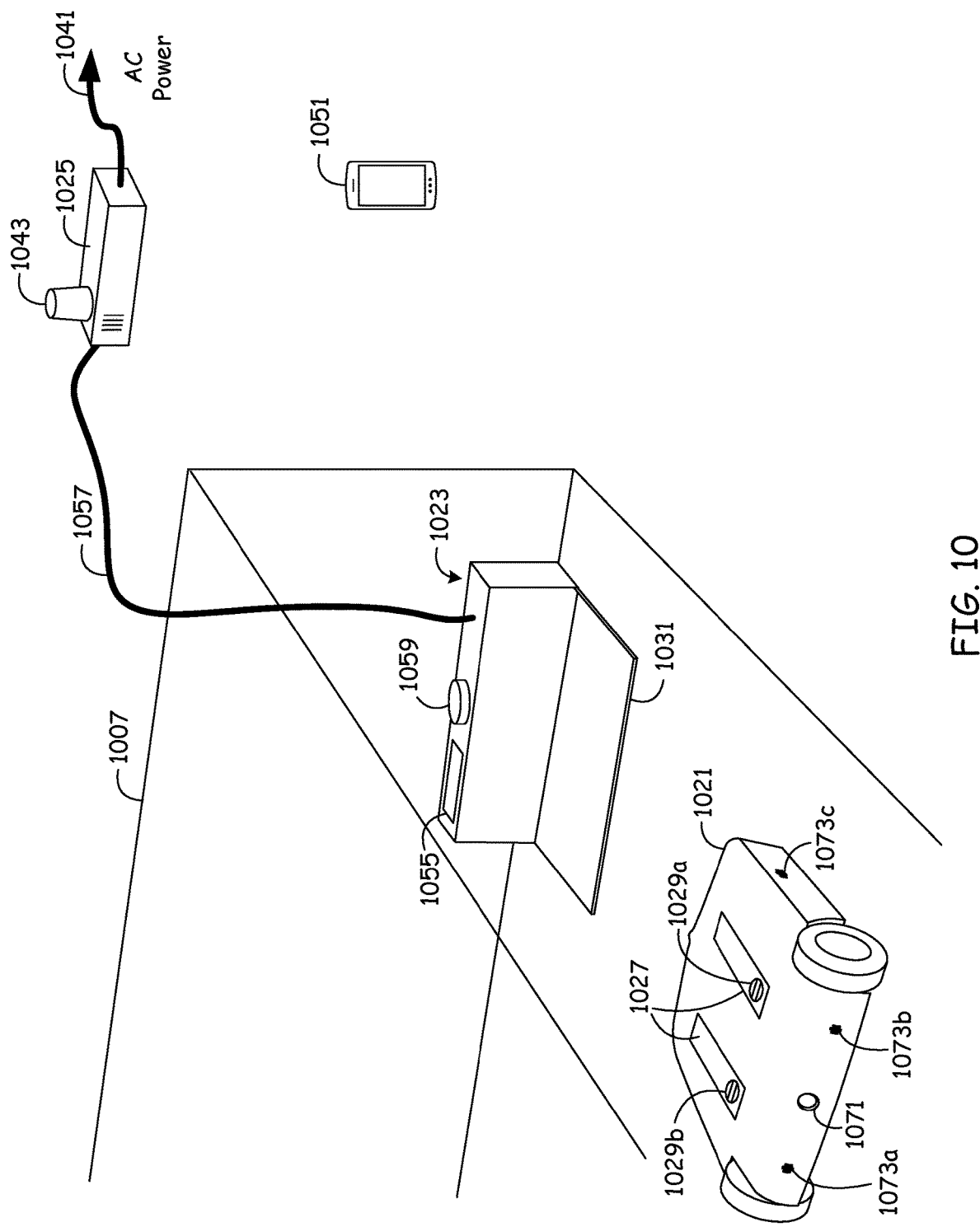
FIG. 10 is a perspective diagram of a safety monitoring system capable of sensing and alerting someone unauthorized who is in a pool swimming, but also alerting someone who happens to come close to a swimming pool, who is not yet entered the pool, wherein the safety monitoring system then communicates a notification, employing a mobile phone, to the owner/management of the premises.

FIG. 10 is a perspective diagram of a safety monitoring system 1005 capable of sensing and alerting someone unauthorized who is in a pool swimming, but also alerting someone who happens to come close to a swimming pool 1007, who is not yet entered the pool, wherein the safety monitoring system 1005 then communicates a notification, employing a mobile phone 1051, to the owner/management of the premises. Sending a notification to an owner of the premises is important when the owner doesn't expect anyone to be near the pool or when a swimmer is determined to be in trouble in the pool. Thus, when a little kid 1031 or dog (any pet) wandering close to the pool is detected, a photo is taken, and a message (MMS or text with photo, or even a video in some configurations) is sent to the owner who can then trigger a warning voice message if necessary. "Please move away from the pool" or some such warming message would be appropriate to warn a wandering kid away from the swimming pool 1007. Thus, the safety monitoring system 1005 deters or prevents drowning by warning/shooing away kids or pets from the pool before they fall in. It also employs a pool cleaner unit 1021 that is submersible and stays in the swimming pool 1007, a wireless charging unit 1023 that is stationed at the bottom of the pool, and an external powering controller 1025 to provide it cleaning, safety monitoring and alerting services.

In general, safety monitoring system 1005 provides three locations for processing various inputs and conducting its operations, the pool cleaner unit 1021 (also referred sometimes as the cleaning bot or a robotic cleaning system) itself, the external powering controller 1025 which is usually an out-of-water external charging/controller unit, and the wireless charging unit 1023 in the water (if used). In some configurations, all or any combination of these processing locations may be deployed and used. They can also work separately employing dedicated function and communication pathways.

In one configuration, the safety monitoring system 1005 supports safety and monitoring capabilities in and around a swimming pool area, and it comprises an in-water monitoring device, such as the pool cleaner unit 1021, the wireless charging unit 1023 or an inflatable accessory capable of motion. The safety monitoring system 1005 also comprises an above-water monitoring device, such as the external powering controller 1025. The in-water monitoring device and the above-water monitoring device at least assist in identification and prevention of drowning events.

In one configuration of the safety monitoring system 1005, the in-water monitoring device comprises a robotic cleaning system 1021 (also referred to as the pool cleaner unit 1021). In a related configuration, the in-water monitoring device comprises a rechargeable battery. In another related configuration of the safety monitoring system 1005, the in-water monitoring device comprises a buoy portion and a mobility portion that is disposed on the buoy portion. For example, it is an independent inflatable element 1441 that is floatation ready and includes a motor and jet to direct the floatation device 1441 to a drowning person.

In another related configuration of the safety monitoring system 1005 the above-water monitoring device comprises a pool cover unit (described with reference to FIGS. 14 and 15 down below). In yet another related configuration of the safety monitoring system 1005 the above-water monitoring device comprises a camera element that supports a visual recognition process.

The pool cleaner unit 1021 comprises, in one configuration, chemical treatment containers 1027 each with integrated valves 1029*a* 1029*b*, for dispensing chemicals as needed, keeps the pool clean even as it maps the pool automatically, warns owners of potential danger to swimmers and monitors quality of the water. The containers 1027 are used for dispensing chemicals as needed, and provide a tight lid which when open allows filling of cleaning chemicals from chemical supply bottles. When chemicals have to be dispensed, it is released from a spout or water outlet. The pool cleaner unit 1021 monitors the pool for safety of swimmers even while it cleans the bottom and sides of the swimming pool with rotating cleaning elements on its bottom and sides not shown (see FIG. 13).

In one configuration, the pool cleaner unit 1021 comprises a processor, memory, motion monitoring sensors, optional audio inputs, cleaner navigation & control manager software, cleaner chemicals management software, cleaning chemicals release elements, water quality testing elements, and built-in cleaning functionality. It also comprises an operational control support that supports various water quality testing, pool cleaning and management services, pool mapping services, and an AI engine that learns from user behavior, mapping, cleaning frequency data collected and observations made.

The wireless charging unit 1023 comprises solar panels 1055 for generating solar panels, and it is also powered a DC power and communication cable 1057 for wired communication to the poolside external controller box 1025 that plugs into an AC power outlet. The wireless charging unit 1023 also includes multiple wireless communication capabilities for communicating with the pool cleaning unit 1021 and poolside external controller box 1025. Likewise poolside external controller box 1025 and pool cleaning unit 1021 both contain the multiple wireless communication capabilities. The poolside external controller box 1025 also includes the corresponding wireless communication circuitry for communicating with the poolside external controller box 1025 over the DC power and communication cable 1057. The wireless charging unit 1023 in one configuration is a hermetic sealed underwater charging, dual unit capable of wirelessly charging the pool cleaning unit 1021 using stored solar power as well as DC power provided from an external source. The amount of sunlight currently incident on the solar panels 1055 is measured, and the location of the pool cleaning unit 1021 is adjusted to optimize power generation—the pool cleaning unit 1021 is moved to a better location based on power generation measured and historical data available on sunlight during various times of the day at various locations inside the pool.

In an exemplary configuration, the wireless charging unit 1023 is a DC powered magnetic resonant charging box 1023 that comprises a processor & memory, a resonant charger, a water penetration detect/shutoff manager, a cleaner communication circuitry (for wired to wireless bridging), and optionally in some configurations with alert and notification managers, etc. It employs solar panels 1055 for recharging its batteries if necessary during daytime. It provides a wireless recharging pad 1031 on top of (or in proximity to) which the pool cleaner unit 1021 positions itself for wirelessly charging its batteries. The wireless charging unit 1023 detects and reports drowning events of pets or people, swimmers, and objects floating in the pool. It is capable of detection activity using a camera unit 1059, which also aids pool water clarity detection and day and night detection for changing operations or switching monitoring features if necessary.

In an exemplary configuration, the external powering controller 1025 comprises a processor & memory, AC to DC converter circuitry, DC power outlet cables, an Owner/EMT/neighbor/Staff communication manager, alarm lights 1043, an image capture camera, video capture sensors, directional microphones 1045, and communication circuitry to communicate with the external mobile phone 1051 and with the pool cleaner unit 1021. It employs a AC cable 1041 to connect to a AC outlet or AC power source.

In one configuration, the wireless charging unit 1023 supports wireless communication and control, with external mobile phone units 1051 and available WiFi routers. It also interacts with an external power unit 1025 that feeds it DC power while consuming AC power from a AC power outlet. The wireless charging unit 1023 also provides management functionality in addition to wireless recharging functionality. For example, it can communicate images, videos and messages to the mobile phone 1051 to alert an owner or to a security management system to alert them of unauthorized access of the swimming pool, swimmers in apparent trouble in the pool, infants or pets approaching the swimming pool, etc.

The mobile 1051 has circuitry needed for communicating with pool cleaner unit 1021, the external powering controller 1025 and the wireless charging unit 1023. For example, WiFi and cellular communication circuitry are provided for communicating with pool cleaner unit 1021, the external powering controller 1025 and the wireless charging unit 1023.

In one configuration, the pool cleaner unit 1021 comprises a wireless charging circuitry and elements such as coils for wireless charging. It also comprises a processing and memory circuitry and is capable of two path communications with an external monitoring service or mobile app employing a two-path communication circuitry. For example, it is capable of WiFi based communications employing a WiFi based communication circuitry as well as mobile communications using a SIM card 1061 and cellular communications circuitry.

The mobile phone 1051 is used for setting up all the various units, such as the pool cleaner unit 1021, external powering controller 1025 and the wireless charging unit 1023. It is used to schedule tasks, schedule conditions to flag, schedule status reports, provide facial recognition inputs, provide body profile inputs, etc.

The mobile phone 1051 might replace external powering controller 1025 is some configurations. The pool cleaner unit 1021 determines a best location for solar power recharging as it moves around and discovers which location is optimum for solar charging. It comprises an inlet 1071 and outlet for water in one embodiment that aids in capturing water or allowing flowing water for testing it for pollutants, chemicals etc. The pool cleaner unit 1021 comprises a camera location in some other embodiments for the same purpose, as well as for monitoring swimmers and potential drowning events. Using the camera, the pool cleaner unit 1021 looks at what is on walls, on pool bottom, and determines its cleaning and chemical treatment needs. It can detect water particulates, for example by shining light, gathering its reflection and studying the reflection gathered for pollution detection and chemical treatment. In one configuration, the inlet/outlet 1071 serves to dispense/release cleaning fluid into the swimming pool 1007 in a controlled manner.

The pool cleaner unit 1021 conducts mapping of the swimming pool 1007 and it also determines optimum places to station itself if it comprises solar recharging elements. It maintains a schedule of cleaning, reports on actual time taken for cleaning in the various seasons, etc. It also comprises an operational control support that supports various water quality testing, pool cleaning and management services, pool mapping services, and an AI engine that learns from user behavior, mapping, cleaning frequency data collected and observations made.

The external powering controller 1025 as well as the pool cleaner unit 1021 are capable of facial feature detection, body profile detection, authorized user detection, etc. It can determine if the swimmers are authorized and it can seek authorization from an owner or security service if it determines that the swimmer is unauthorized. It can send emergency notifications in case of emergencies, alerts in case of detecting unauthorized swimmers or children in proximity to the pool 1007, and issue warning in audio form, visual indications and flashing lights. It can detect and report on trespasses and issue alerts to neighbors and police too in case of emergencies.

The pool cleaner unit 1021 also comprises audio inputs, and camera inputs. For example, it uses a camera imager to get a good look at the water quality, and detects swimmers in trouble based on audio input from stereophonic audio reception. Its wheels have cleaning brushes that clean the pool surface as it moves. By shining an IR light it looks for murkiness, and releases chemicals from side outlets to clean water, and collects water to conduct chemical water tests.

The pool cleaner unit 1021 is one embodiment comprises an open valve to collect water and analyze it. Water that flows in from an inlet for testing water quality flows out of an outlet when released back to the pool. It comprises a chemical kit for analysis, and also shines light to see how murky the water in the pool is.

In some configurations, the pool cleaner unit 1021 comprises fish eye lens on top, and is capable of manipulating or massaging the images that need to be corrected before being displayed to user. A plurality of microphones 1073*a* 1073*b* 1073*c* disposed on various sides of the pool cleaner unit 121 (for proper audio input reception/coverage, for stereophonic audio reception, etc.) provide for audio inputs (for example stereophonic) that facilitate locating people in trouble (splashing wildly in water for example) and trespassing.

Similarly, the external powering controller 1025 comprises audio and video inputs that aid in detecting dangerous situations, detecting trespasses, etc.

In one configuration, the pool cleaner unit 1021 is located in the water with only the mobile phone 1051 or a PC used outside with which the pool cleaner unit 1021 interacts and communicates data and alerts. In this mode, interactions with the mobile phone 1051 is by wireless means (cellular or WiFi based) and reports and alerts are sent to the mobile phone 1051. Scheduling and management of cleaning services are conducted from the mobile phone 1051 and levels of cleaning chemicals, need for replenishment, inability to clean, operational problems are reported to the mobile phone 1051 by the pool cleaner unit 1021.

The safety monitoring system 1005 is capable of confirming that an owner is in the pool 1007, that only authorized swimmers are in the pool, that unauthorized swimmers are alerted and warned through audio and visual warning signals and messages, etc.

In one configuration, the pool cleaner unit 1021 is a submersible cleaning element 1021 that charges magnetically (wireless magnetic/inductance based charging) using a DC powered magnetic resonant charger 1023 that is attached via a DC power and communication cable to a poolside box 1025 that plugs into an AC power outlet. The external powering controller 1025 also contains that communication element (e.g., WiFi, wired Ethernet & cellular) to send commands, receive commands, send alerts, notifications, receive instructions, etc. The external powering controller 1025 and the submersible element 1021 coordinate poolside monitoring and act together for detection of unauthorized "coming near the pool" (for example, the poolside box 1025 detects and takes photos & sends warnings, sends notifications, makes loud audible alerts, etc. and warns away in addition to sending MMS to owner). The external powering controller 1025 and the submersible 1021 together also detect "falling/jumping into the pool" (for example, external powering controller 1025 and submersible 1021 detect & respond), and drowning sounds and calls for help (response to such events detected is configurable, and, for example, involves communicating a photo plus video and text alert full response to owner, and in addition to emergency personnel).

The external powering controller 1025 allows owner & emergency personnel to use a communication channel (for example using voice) that can be also be employed to deliver either AI based or prerecorded human based warning and instructions, such as the following:

to warn a person: "get-away, police will arrest you for trespassing" (a photo is also taken)

to scare a person away: "your mother is calling you" (other messages based on an expected/estimated age), save from drowning: "please grab the inflatable bag as instructed", to help in first aid: "please perform CPR as instructed" (even video is displayed on external powering controller 1025 or via shown on a mobile phone 1051), to alerts others of emergency situation: triggers alarm and flashing light on external powering controller 1025, to save a drowning person: external powering controller 1025 takes video that is analyzed and used to recognize a potential drowning event, and such analysis is also used to guide or direct an inflatable (flotation device included) to the drowning person, or to also simultaneously push a drowning person to the edge of the swimming pool 1007 while also providing instructions to wait (for example "help is coming" audio message provided repeatedly), or provide an advice to "grab the pool edge and hold on".

The safety monitoring system 1005 provides a solution that is modular. While in one configuration pool cleaner unit 1021 conducts robot control processing (operation control, pool cleaning management, etc.) and also provides WiFi service that is built in, other light-weight configurations are also supported wherein a not-so-smart robot element pool cleaner unit 1021 is managed and controlled by a very external powering controller 1025, with all the smarts for the present disclosure provided within the external powering controller 1025 unit. In addition, the use of an independent inflatable element 1441 that is floatation ready and includes a motor and jet to direct the floatation device to a drowning person is also contemplated. This independent accessory of sorts, the independent inflatable element 1441, acts like a flotation device 1441 that is guided towards a potential drowning event/location by the external powering controller 1025. Thus, the pool cleaner unit 1021, the floatation device 1441, and the external powering controller 1025 unit that powers both detect events, sense situations, and direct the whole poolside cleaning and emergency services while each can also operate independently. In one configuration, the external powering controller 1025 functionality is split into two separate boxes, one for managing interactions with the flotation device 1241 and another to manage interactions with the pool cleaner unit 1021.

In one exemplary configuration, the external powering controller 1025 which is sometimes referred to as the poolside box unit 1025, acts like an external control unit and it comprises a processor & memory, an AC to DC power w/charger, a water penetration detect & shutoff, a cleaner communication circuitry (wired or wireless) for communication with the submersible cleaner, a cleaner navigation & control unit, a charger control, an Owner/EMT/neighbor/Staff communication circuitry, alarm lights, an audible horn, a music streaming manager, a Video Player, a camera for Premises Image capture, Video Capture Sensors (may be combined with premises image capture) and Directional Microphone circuitry for event detection etc. Thus the safety monitoring system 1005 detects a kid or animal or other human coming to close to a private pool 1007 that triggers the owner alert and warnings and permission seeking behavior described above. The pool cleaner unit 1021 as usual conducts cleaning of the pool 1007 too and is capable of dispensing cleaning fluids/chemical. In one related configuration, the cleaning fluids/chemical is provided/replenished by the DC powered wireless charging unit 123 (in some configurations a magnetic resonant charging box 1023) as well as by the pool cleaner unit 1021.

The external powering controller 1025 also comprises an operational control support manager that employs a user and application command interface to interact with users and with downloaded applications etc. In particular, it employs a voice recognition and synthesis manager for user interactions and for providing audio instructions to users, etc.

The external powering controller 1025 also a manager to conduct artificial intelligence based analysis to learn appropriate responses from monitoring user behavior, user environment characteristics and frequency of various event occurrences and responses for those events. It processes inputs received from various sensors including audio inputs received from one or more microphones, image capture information and video capture information, water chemical composition information, etc. It conducts video analysis, security analysis, facial recognition, situation recognition, etc. Recognition of a dangerous situation developing, such as a swimmer drowning, and alerting one or more users, or an owner of the premises, or a police services, or a security monitoring service, by the external powering controller 1025 is critical.

The poolside box unit 1025 also provides customized entertainment and as well as video instructions in an emergency situation.

Figure 11:
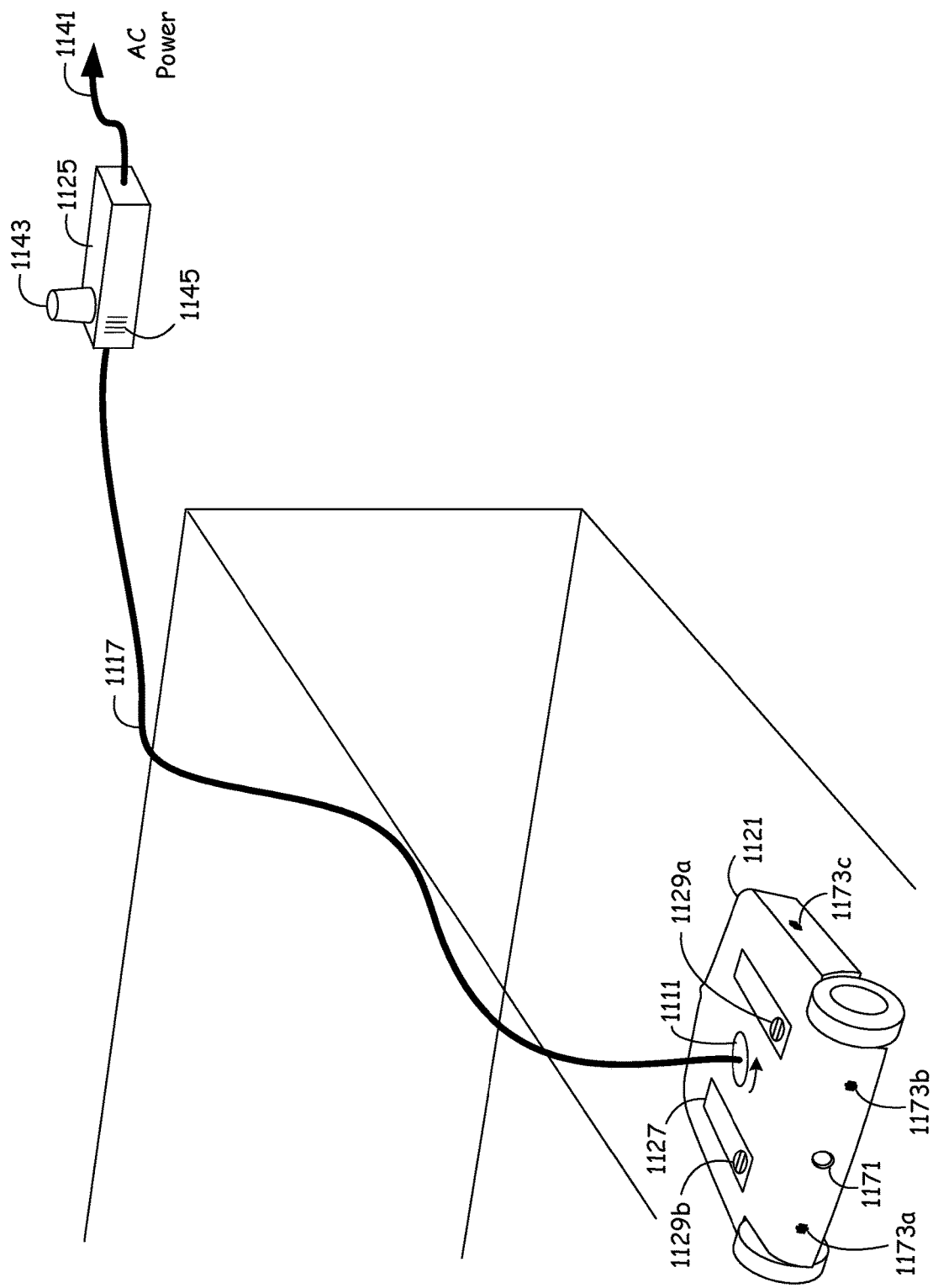
FIG. 11 is a perspective block diagram of a safety monitoring system capable of sensing and alerting someone who happens to come close to a swimming pool, wherein an external powering controller (sometimes referred to as the poolside box) that plugs into an AC power outlet provides required power via a DC power cable directly to a pool cleaner unit.

FIG. 11 is a perspective block diagram of a safety monitoring system 1105 capable of sensing and alerting someone who happens to come close to a swimming pool, wherein an external powering controller 1125 (sometimes referred to as the poolside box) that plugs into an AC power outlet provides required power via a DC power cable directly to a pool cleaner unit 1121. It provides monitoring and control functionality to pool cleaner unit 1121. The pool cleaner unit 1121 and the external powering controller 1125 are communicatively and electrically coupled using a submersible retractable DC power and communication cable 1117, which is a retractable charging and communication cable that runs as an automatic retractable tether. In general, the functionality and operations of the external powering controller 1125 and that of the pool cleaner unit 1121 are as defined in FIG. 10 for the external powering controller 1025 and pool cleaner unit 1021 respectively.

Figure 12:
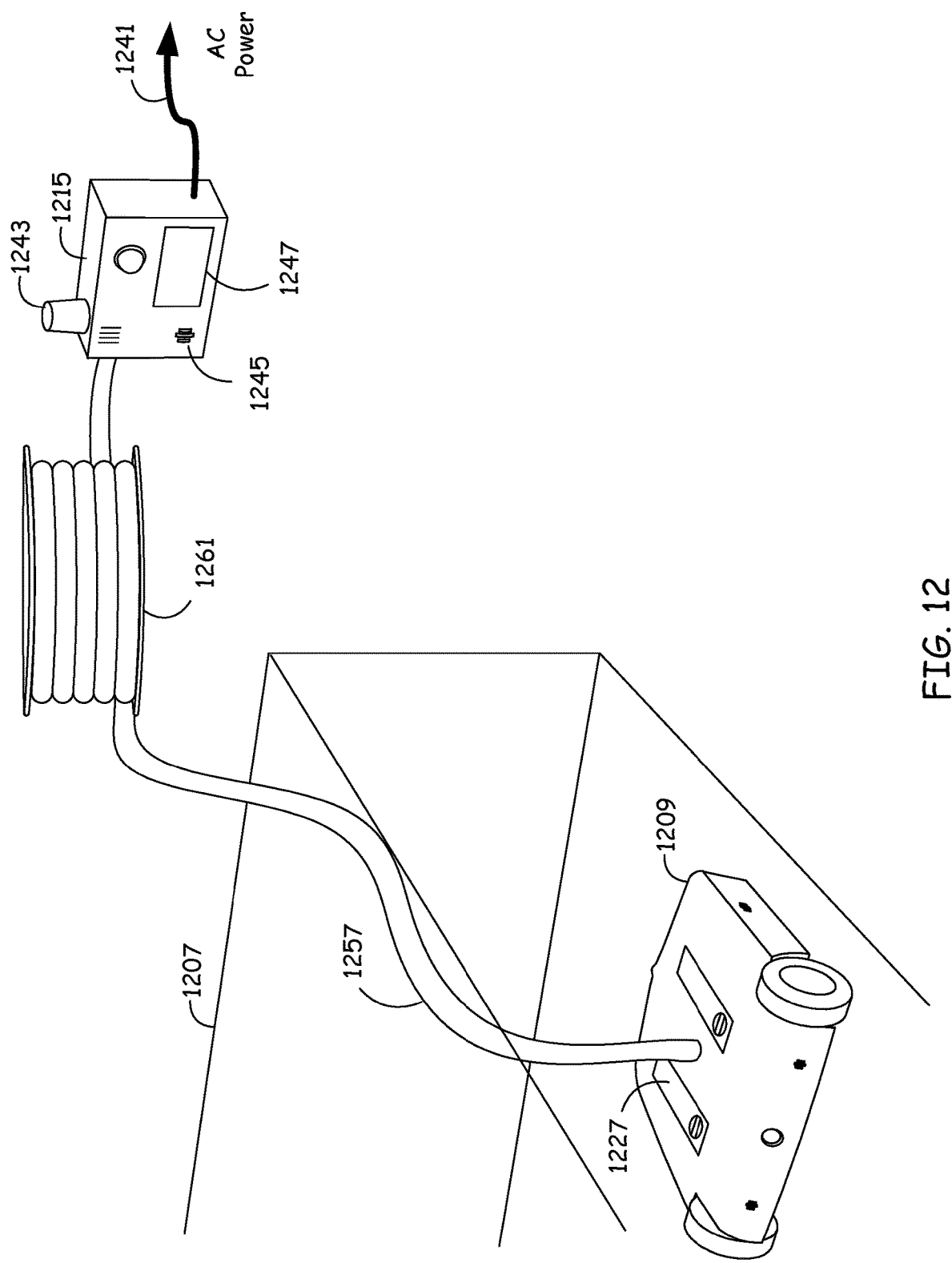
FIG. 12 is a perspective block diagram of a safety monitoring system with an external poolside box and control unit that connects to and powers the operation of a submersible robotic cleaning and monitoring unit with a retractable hose, wherein the retractable water hose also provides a dual mode water flow pathway as well as a DC power and communication cable.

FIG. 12 is a perspective block diagram of a safety monitoring system 1205 with an external poolside box and control unit 1215 that connects to and powers the operation of a submersible robotic cleaning and monitoring unit 1209 with a retractable hose 1257, wherein the retractable water hose 1257 also provides a dual mode water flow pathway as well as a DC power and communication cable. The external poolside box and control unit 1215 in coordination with the submersible robotic cleaning and monitoring unit 1209 senses the presence and alerts anyone who happens to come close to a swimming pool 1207. The external poolside box and control unit 1215 that plugs into an AC power outlet with a cable 1241 provides required external water pumping and filtering services for the submersible robotic cleaning and monitoring unit 1209. Thus using the retractable hose 1257, pressured water flow is provided for the motion of the submersible robotic cleaning. For example the wheels of the submersible robotic cleaning and monitoring unit 1209 are provided pressured flowing water that makes the submersible robotic cleaning and monitoring unit 1209 move to a desired location or move about in predetermined patterns, or as directed by a human cleaning agent, for cleaning the swimming pool 1207.

The external poolside box and control unit 1215 is a control unit to which the retractable hose 1257 is attached, wherein retractable hose 1257 also provides DC power. The retractable hose 1257 acts as a flex piping unit, with dual mode water flow pathway as well as a DC power and communication cable. The external poolside box and control unit 1215 acts like an external pump unit, that provides water filtering of water provided from the swimming pool via an inlet flow pipe, and pumps back cleaned filtered water back into the pool via second outlet flow pipe that releases the clean exhaust water. Water being pumped down thru the retractable hose in the outlet flow pipe helps in motion of the submersible robotic cleaning and monitoring unit 1209. The submersible robotic cleaning and monitoring unit 1209 is capable of driving around using solar power too in a related embodiment, wherein solar charging is facilitated by solar panels on its top surface. The external poolside box and control unit 1215 displays flashing emergency light with appropriate light colors to indicate different conditions using the warning lights 1243. It is collects audio information employing a microphone 1245 (stereophonic in one configuration) and routes audio information to an external mobile device 1051 or to a monitoring system (such as a 3rd party security service). A touch sensitive display system 1247 is provided for user interactions and for displaying messages, alerts, warnings and instructions as needed.

In a related configuration, the submersible robotic cleaning and monitoring unit 1209 and the poolside box and control unit 1215 are communicatively and electrically coupled using the retractable vacuum hose 1257 that not only provides DC power and communication capabilities but also facilitates vacuuming by acting as a hose.

The poolside box and control unit 1215 comprises, in one configuration, a processor and memory that runs apps/software applications and firmware for various types of sensing, processing, monitoring and cleaning functionality, a sensor/capture elements and interface circuitry that provides various inputs such as audio inputs that help determine dangerous situations where help must be called or safety systems need to be deployed, etc. The poolside box and control unit 1215 furthermore comprises wireless (e.g. cellular plus WiFi) and wired communication circuitry for communicating with each other and with external systems, a water testing control circuitry and elements that, for example, involve repeatable optical and chemical tests, and cleaning/dispensing elements and associated interface circuitry which provide status on cleaning supplies and track their usage too.

The poolside box and control unit 1215 also comprises mobility elements and control circuitry that aid in mobility inside the pool and facilitate mapping of the pool bottom, a user interface elements and associated circuitry that facilitates interactions with a user, gathering of user inputs for processing, and display of various status and data to a user or to a user's monitoring device/mobile phone, and local/remote power supply/source circuitry and elements to power the cleaning operations, safety monitoring operations, and various other functionality.

Figure 13:
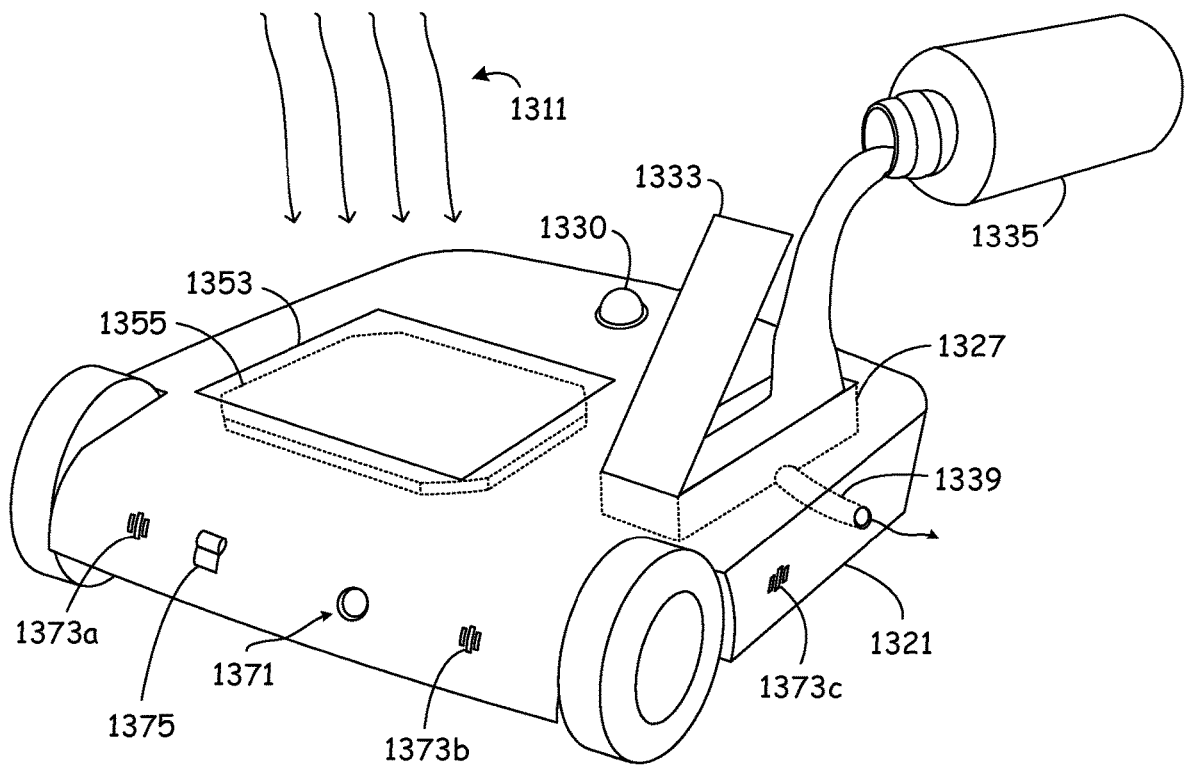
FIG. 13 is a schematic block diagram of a pool cleaner unit that dispenses cleaning chemicals to keep water clean and also locates itself on the bottom of the pool for optimum incident sunlight input based on incident sunlight measurements it conducts during its operation and the sunlight measurements at various points of the swimming pool it collects during various times of the day during its operation.
Figure 13:
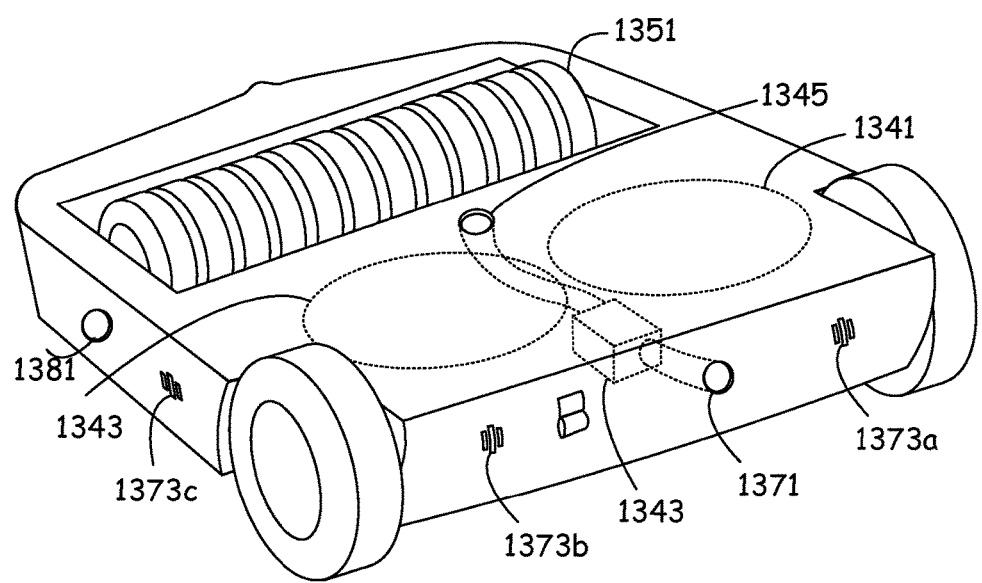

FIG. 13 is a schematic block diagram of a pool cleaner unit 1321 that dispenses cleaning chemicals to keep water clean and also locates itself on the bottom of the pool for optimum incident sunlight input based on incident sunlight 1311 measurements it conducts during its operation and the sunlight measurements at various points of the swimming pool it collects during various times of the day during its operation. When it is not being used to clean the swimming pool, or when it runs out of battery power and needs to recharge itself, it locates itself at the optimum sunlight location to recharge itself. Alternately, if a wireless charging unit 1023 is also available in the pool, the pool cleaner unit 1321 uses its wireless recharging features to charge itself with the aid of the wireless charging unit 1023. For example, it moves to the wireless charging pad portion 1031 which, if present, includes a pair of resonant inductive charging coils for example, that couples with counterpart charging coils 1341 on the pool cleaner unit 1321. The resonant inductive charging coils on the wireless charging pad portion 1031 can be several in number and may vary in size.

The pool cleaner unit 1321, in one configuration, comprises a chemical treatment containers 1327 for dispensing chemicals as needed, which provides a tight lid 1333 which when open allows filling of cleaning chemicals from chemical supply bottles 1335. When chemicals have to be dispensed, it is released from the spout 1339 or an alternate spout. The pool cleaner unit 1321 monitors the pool for safety of swimmers even while it cleans the bottom and sides of the swimming pool with rotating cleaning elements 1351 (for example, a cleaning brush or cleaning wheel) on its bottom and sides not shown, which has bristles in one configuration, a rotating brush in another configuration, and rough cleaning pads on yet another related configuration. It comprises an inlet 1371 and outlet 1345 for flowing water in one embodiment that aids in capturing water into a water testing cavity 1343, allowing flowing water to be tested for pollutants, chemicals etc. It also comprises an optional outlet for chemical distribution 1381 that are used to clean the swimming pool water, used to kill bacteria, used to reduced or increase acidity level and chlorine content, etc.

The pool cleaner unit 1321 comprises a fisheye lens camera 1330 in one configuration, that comprises a wide-angle lens that captures broad, panoramic and hemispherical images with distorted appearance, that is capable of providing increased detail, coverage of digital images it takes for monitoring safety of swimmers. It provides a distorted image which when de-wrapped provides a powerful surveillance tool that presents much more surveillance coverage than a traditional lens. In one configuration, in order to take advantage of the full value of 360-degree surveillance afforded by the fisheye lens camera, a video management system with built-in de-warping functionality is incorporated in an associated pool safety system where the pool cleaner unit 1321 is deployed. De-warping takes original images from 360-degree fisheye lens camera and 'de-warps' them to allow surveillance personnel to view portions of the full video image without distortion. To surveillance personnel these de-wrapped "virtual camera views" appear as standard camera views in their user interface, providing intuitive camera selection.

The pool cleaner unit 1321 comprises a buoyant safety device 1353 which is used to store an inflatable airbag or a safety buoy 1355, that is released under or close to a potential drowning victim or swimmer, when it is automatically determined that a dangerous situation is developing for a swimmer. The pool cleaner unit 1321 monitors the pool for safety of swimmers, approaches them when necessary, and releases the attached buoyant safety device 1353 and continues to monitor and report the situation.

In another related configuration, the on top of a cover of the buoyant safety device 1353, a solar panel (or one or more solar panels) is provided, configured to recharge batteries (not shown) using incident sunlight 1311, wherein the battery charge powers the motion and operation of the pool cleaner unit 1321.

The pool cleaner unit 1321 comprises, in one configuration, a processor and memory that runs apps/software applications and firmware for various types of sensing, processing, monitoring and cleaning functionality, a sensor/capture elements and interface circuitry that provides various inputs such as audio inputs that help determine dangerous situations where help must be called or safety systems need to be deployed, etc. The pool cleaner unit 1321 furthermore comprises wireless (e.g. cellular plus WiFi) and wired communication circuitry for communicating with each other and with external systems, a water testing control circuitry and elements that, for example, involve repeatable optical and chemical tests, and cleaning/dispensing elements and associated interface circuitry which provide status on cleaning supplies and track their usage too.

The pool cleaner unit 1321 also comprises mobility elements and control circuitry that aid in mobility inside the pool and facilitate mapping of the pool bottom, a user interface elements and associated circuitry that facilitates interactions with a user, gathering of user inputs for processing, and display of various status and data to a user or to a user's monitoring device/mobile phone, and local/remote power supply/source circuitry and elements to power the cleaning operations, safety monitoring operations, and various other functionality.

Figure 14:
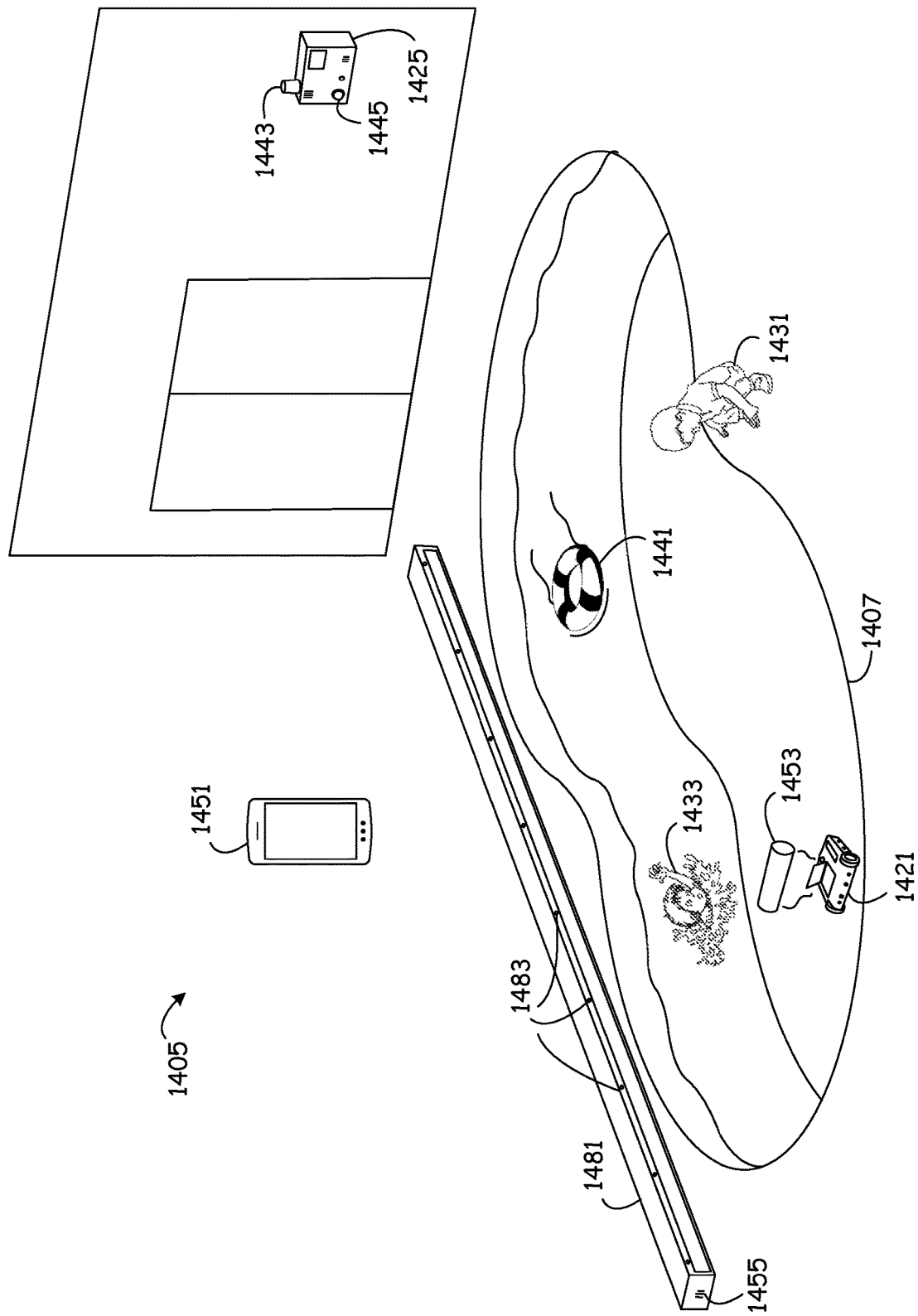
FIG. 14 is a schematic block diagram of the poolside safety system with a poolside external control unit such as the external power unit of FIG. 10, and a submersible cleaning unit with a buoyant safety device that is released in close proximity to a drowning person or someone who needs help while in the swimming pool.

FIG. 14 is a schematic block diagram of the poolside safety system 1405 with a poolside external control unit 1425 such as the external power unit 1025 of FIG. 10, and a submersible cleaning unit 1421 with a buoyant safety device 1453 that is released in close proximity to a drowning person or someone who needs help while in the swimming pool 1407. In addition, the use of an independent inflatable element 1441 that is floatation ready and includes a motor and jet (at least one water jet generator for motion) to direct the floatation device 1441 to a drowning person 1433 is also provided for. This independent accessory of sorts, the independent inflatable element 1441, acts like a flotation device 1441 that is in one configuration guided towards a potential drowning event/location 1433 by the poolside external control unit 1425. Thus, the submersible cleaner 1421, the floatation device 1441, and the poolside external control unit 1425 unit all detect events, sense situations, and direct the whole poolside cleaning and emergency safety services. Management of poolside cleaning service is facilitated by means of a safety and cleaning services app that is downloadable for execution on a mobile device 1451 or onto a laptop/PC (not shown). In some configurations, only the submersible cleaner 1421 and the mobile phone 1451 are employed without the poolside external control unit 1425.

An external retractable pool cover 1481 provides motorized pool covering capabilities with audio input gathering for emergency detection, warning light 1483 (such as LED lights) flashing features for alerting a swimmer 1433 or person 1431 in proximity to the pool 1407, and rolling wheel movements on the sides for spreading the covers when needed. The mobility management aspect of the external retractable pool cover 1481 makes it possible to remotely manage its usage, its features and configuration. An owner or security service can shut the covers 1481 by remote commands via mobile phone 1451 or by using the display and interaction screens provided by the poolside external control unit 1425. If an unauthorized swimmer is detected, he/she is warned to stop swimming and leave. When it is detected that the unauthorized user has left the pool, the covers are automatically drawn out in one configuration. Similarly, if a child 1431 is detected edging close to the pool, alerts are sent to the mobile device 1451 and the pool covers are drawn out to cover the pool. If the child is determined to have fallen into the pool before the covers 1481 are completely drawn, alerts are sent as appropriate and the pool covers are quickly drawn back/retracted so as to make it easy to retrieve the child. Simultaneously, the independent inflatable safety devices 1441 are directed to rescue the child by floating close to the child, and the submersible cleaner is directed to release its attached airbags, buoy's etc. In one related configuration, the lights 1483 provide inputs for visual scanning of the pool surface to detect the presence of a swimmer, to detect potentially dangerous situations from occurring. Such detection is needed when the retractable pool cover 1481 is activated to cover the pool, and a swimmer is in the pool and is likely to be covered up by the pool covers 1481 thereby creating a potentially dangerous situation. Thus, the lights 1483 (infrared lights in one related configuration, visible+infrared sights in another related configuration, etc.) also comprise detectors that detect returned lights bouncing back from the water surface and swimmers, etc. For example, the lights 1483 are LEDs that detect a narrow band of wavelengths, and behave as a silicon spectrally selective photodiodes with a very broad spectral response, (for example about 400 nm violet to 1,000 nm invisible near-IR). Thus the lights 1483 (LEDs) both emit and detect light, and, even when in an open position, facilitate detection of the swimmer in the pool, the submersible cleaner 1421, the floatation device 1441, etc. by providing input signals that are analyzed by its own the processing circuitry or by a processing circuitry of another poolside device/unit, such as the poolside external control unit 1425. In one configuration, the external retractable pool cover 1481 also comprises a camera with which it communicates a video of the swimming pool 1407 to the mobile device 1451 (for example, when instructed by the user of the mobile phone 1451 to activate closing of the external retractable pool cover 1481 over the pool 1407).

For example, external retractable pool cover 1481 comprises, in one configuration, a processor and memory that runs apps/software applications and firmware for various types of sensing, processing, monitoring and cleaning functionality, a sensor/capture elements and interface circuitry that provides various inputs such as audio inputs that help determine dangerous situations where help must be called or safety systems need to be deployed, etc. Furthermore it comprises wireless (e.g. cellular plus WiFi) and wired communication circuitry for communicating with each other and with external systems, a water testing control circuitry and elements that, for example, involve repeatable optical and chemical tests, and cleaning/dispensing elements and associated interface circuitry which provide status on cleaning supplies and track their usage too. It comprises audio and video recording functionality, and ability to detect and react to potentially dangerous situations, such as by monitoring stereophonic audio inputs. It also comprises a plurality of LED lights (or even some other lighting means) to flash when instructed to indicate a dangerous situation, to play a warning message in audio form to kids playing near the pool or swimmers in trouble, etc.

The independent inflatable safety devices 1441 is a self-propelling floating mobile entity, such as a propeller based mobile device in one configuration and a motor based device in another configuration. For example, it comprises a processor and memory that runs apps/software applications and firmware for various types of sensing, processing, monitoring and cleaning functionality, a sensor/capture elements and interface circuitry that provides various inputs such as audio inputs that help determine dangerous situations where help must be called or safety systems need to be deployed, etc. Furthermore it comprises wireless (e.g. cellular plus WiFi) and wired communication circuitry for communicating with each other and with external systems, a water testing control circuitry and elements that, for example, involve repeatable optical and chemical tests, and cleaning/dispensing elements and associated interface circuitry which provide status on cleaning supplies and track their usage too. It comprises audio and video recording functionality, and ability to detect and react to potentially dangerous situations, such as by monitoring stereophonic audio inputs.

The poolside external control unit 1425 provides monitoring and emergency detection and emergency handling services. The pool side external control unit 1425 comprises a processor & memory, an AC to DC power w/charger, a water penetration detect & shutoff, a cleaner communication circuitry (wired or wireless) for communication with the submersible cleaner 1421, a cleaner navigation & control unit, a charger control, an Owner/EMT/neighbor/Staff communication circuitry, alarm lights 1443, an audible horn, a music streaming manager, a Video Player, a camera for Premises Image capture, Video Capture Sensors (may be combined with premises image capture) and Directional Microphone circuitry 1445 for event detection etc. Thus the safety monitoring system 1405 detects a kid 1431 or animal or other human coming to close to a private pool 1407 that triggers the owner alert and warnings, and permission seeking behavior described above. The submersible cleaner 1421 as usual conducts cleaning of the pool 1407 too and is capable of dispensing cleaning fluids/chemical. In one related configuration, the cleaning fluids/chemical is provided/replenished by a DC powered magnetic resonant charging box located near the bottom of the swimming pool 1407 as well as by the submersible robotic cleaner 1421.

In one configuration, the use of an independent inflatable element 1441 that is floatation ready and includes a motor and jet to direct the floatation device 1441 to a drowning person is managed by the poolside external control unit 1425. This independent accessory of sorts, the independent inflatable element 1441, acts like a flotation device 1441 that is guided towards a potential drowning event/location by the poolside box and poolside external control unit 1425. Thus, the submersible robotic cleaning and monitoring unit 1209, the floatation device 1441, and the poolside external control unit 1425 that detect events, sense situations, and direct the whole poolside cleaning and emergency services while each can also operate independently. In one configuration, the poolside external control unit 1425 functionality is split into two separate units, one for managing interactions with the flotation device 1441 and another to manage interactions with the submersible robotic cleaning and monitoring unit 1421.

In one configuration, the independent inflatable element 1441 is located near the water surface at pool 1407 edge in a dock for a floatation device (sometimes an inflatable flotation device). It receives a message and launches itself toward a flailing swimmer such as the swimmer 1431 when the swimmer 1431 is in the water of the pool 1407. The independent inflatable element 1441 that provides a movable floatation device that is docked for convenience also dispenses chemicals as needed and measure chemical levels in the pool water.

The poolside external control unit 1425 also comprises an operational control support manager that employs a user and application command interface to interact with users and with downloaded applications etc. In particular, it employs a voice recognition and synthesis manager for user interactions and for providing audio instructions to users, etc.

The poolside external control unit 1425 also comprises an artificial intelligence engine that learns from monitoring user behavior, user environment characteristics and frequency of various event occurrences and responses for those events. It employs a sensor processing support manager that processes inputs received from various sensors including audio inputs received from one or more microphones 1445, image capture information from the camera and video capture unit, water chemical composition information received by water tester units, etc. It conducts video analysis, security analysis, facial recognition, situation recognition, operations etc.

The poolside external control unit 1425 also comprises a music streaming manager for customized entertainment and a video player for custom video display as well as video instructions in an emergency situation.

The pool cleaner unit 1421 comprises solar panels for recharging in one configuration. It locates itself on the bottom of the pool 1407 for optimum incident sunlight input based on incident sunlight measurements it conducts during its operation and the sunlight measurements at various points of the swimming pool it collects during various times of the day during its operation. When it is not being used or when it runs out of battery power and needs to recharge itself, it locates itself at the optimum sunlight location to recharge itself. Alternately, if a wireless charging unit 1023 is also available in the pool, the pool cleaner unit 1421 uses its wireless recharging features to charge itself with the aid of the wireless charging unit 1023.

In one configuration, a drowning prevention device (such as the pool cleaner unit 1421, the independent inflatable element 1441, etc.) operates within swimming pool 1407 waters, and it comprises a mobility element, a rechargeable battery, a sensing element and a processing circuitry that interacts with the sensing element to at least assist in identifying a pool activity event. For example, a pool activity event can be an authorized child swimming in the pool, children having a party in the pool, an unauthorized person entering the pool, a child/toddler crawling close to the pool with a potential of an accident occurring, a pet falling into the pool, a swimmer desperately trying not to drown in the pool, etc. The drowning prevention device also comprises a communication circuitry that delivers information regarding the pool activity event. The communication circuitry of the drowning prevention device delivers the information to an out of water device. In a related configuration, the drowning prevention device further comprises a cleaning element. In yet another related configuration, it comprises a wireless charging element.

In another configuration, the drowning prevention device further comprises a solar charging element. In a related configuration the mobility element of the drowning prevention device is operable to position the solar charging element to enhance charging rates.

In another configuration, the drowning prevention device also comprises having a buoy element.

Figure 15:
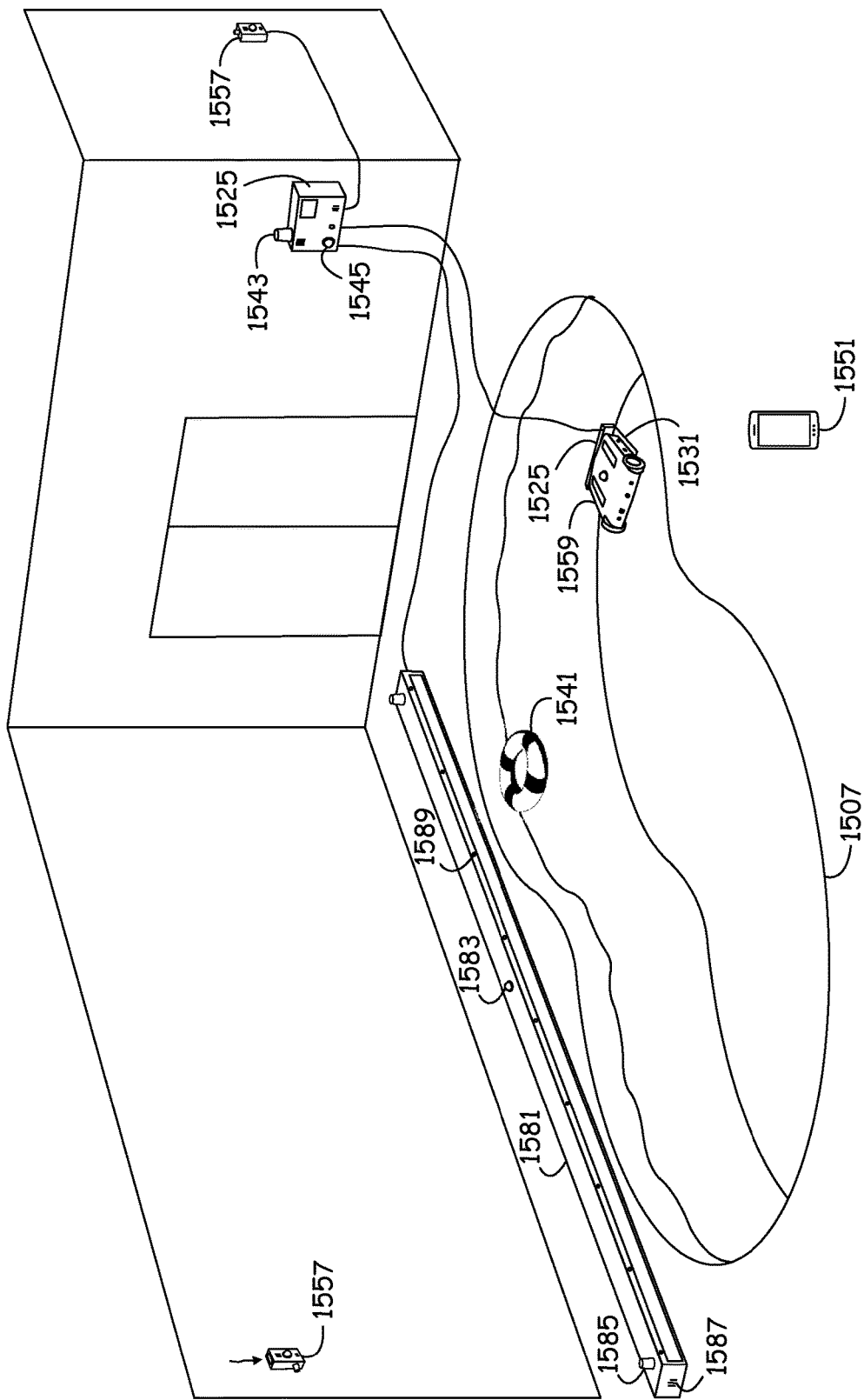
FIG. 15 is a schematic block diagram of the poolside safety system which depicts another exemplary configuration wherein the poolside safety system of FIG. 10 comprises some additional elements such as the additional safety cameras and that take images and videos of trespassers, send those images and videos for authorization checks, and provide alerts to owners and warning messages to trespassers and to children who might be in danger by the swimming pool.

FIG. 15 is a schematic block diagram of the poolside safety system 1505 which depicts another exemplary configuration wherein the poolside safety system of FIG. 10 comprises some additional elements such as the additional safety cameras 1555 and 1557 that take images and videos of trespassers, send those images and videos for authorization checks, and provide alerts to owners and warning messages to trespassers and to children who might be in danger by the swimming pool 1507. In addition, the pool cleaner unit 1521 makes use of the wireless charging unit 1523 that is stationed at the bottom of the pool, and stations itself on the associated charging pad 1531 of the wireless charging unit 1523 when it needs to recharge itself.

In one configuration of the poolside safety system 1505, a drowning prevention device (such as the pool cleaner unit 1521 for example) operates within swimming pool 1507 waters, and it comprises a rechargeable battery, a sensing element, a processing circuitry that interacts with the sensing element to at least assist in identifying a pool activity event, and a mobility element that is operable to move to a position that assists in charging the rechargeable battery. In a related configuration, a charge state of the rechargeable battery effects an operational schedule of the cleaning element. In a related configuration, the drowning prevention device also comprises a cleaning element. In another related configuration, the drowning prevention device also comprises, a wireless charging element. In yet another related configuration, the drowning prevention device also comprises a solar element, and the moving to the position conducted by the mobility element improves solar energy capture.

In one configuration of the drowning prevention device, the pool activity event comprises a potential drowning event. In another configuration of the drowning prevention device the pool activity event comprises a potential drowning event, and the processing circuitry responds to the potential drowning event by triggering an alert communication to be delivered to a cell phone.

Figure 16:
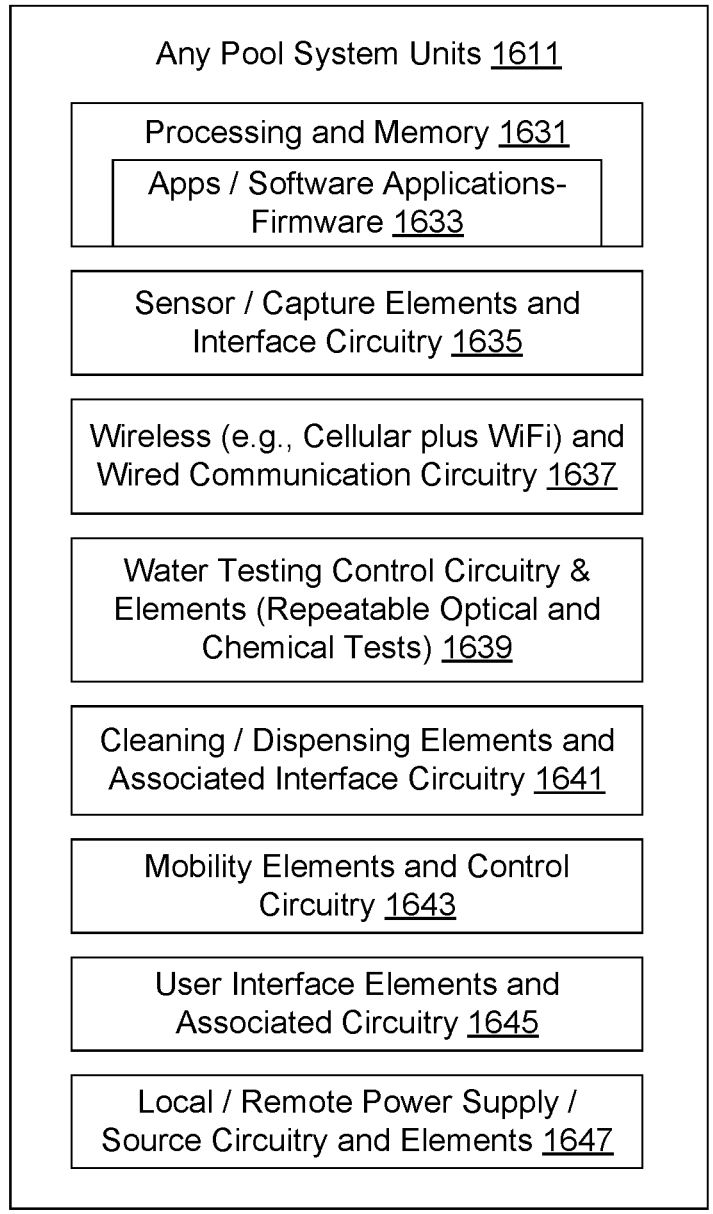
FIG. 16 is a schematic block diagram showing the features and functionality of any pool system units.

FIG. 16 is a schematic block diagram showing the features and functionality of any pool system units 1611. These components, for example, are found in any of the units of a typical safety monitoring system 1005 of FIG. 10, or the pool safety system 1405 of FIG. 14, etc. The any pool system units 1611 comprises a processor and memory 1631 that runs apps/software applications and firmware 1633 for various types of sensing, processing, monitoring and cleaning functionality, a sensor/capture elements and interface circuitry 1635 that provides various inputs such as audio inputs that help determine dangerous situations where help must be called or safety systems need to be deployed, etc. The any pool system units 1611 furthermore comprises wireless (e.g. cellular plus WiFi) and wired communication circuitry 1637 for communicating with each other and with external systems, a water testing control circuitry and elements 1639 that, for example, involve repeatable optical and chemical tests, and cleaning/dispensing elements and associated interface circuitry 1641 which provide status on cleaning supplies and track their usage too.

The any pool system units 1611 also comprises mobility elements and control circuitry 1643 that aid in mobility inside the pool and facilitate mapping of the pool bottom, a user interface elements and associated circuitry 1645 that facilitates interactions with a user, gathering of user inputs for processing, and display of various status and data to a user or to a user's monitoring device/mobile phone, and local/remote power supply/source circuitry and elements 1647 to power the cleaning operations, safety monitoring operations, and various other functionality.

In one configuration, the any pool system units 1611 is a drowning prevention device 1611 that operates within swimming pool waters, and it comprises a rechargeable battery, a sensing element, a processing circuitry 1631 that interacts with the sensing element 1635 to at least assist in identifying a pool activity event, and a mobility element 1643 that is operable to move to a position that assists in charging the rechargeable battery. In a related configuration, the drowning prevention device 1611 also comprises a cleaning element 1641. In a related configuration, a charge state of the rechargeable battery effects an operational schedule of the cleaning element 1641. In another related configuration, the drowning prevention device 1611 also comprises, a wireless charging element. In yet another related configuration, the drowning prevention device 1611 also comprises a solar element, and the moving to the position conducted by the mobility element 1643 improves solar energy capture.

Figure 17:
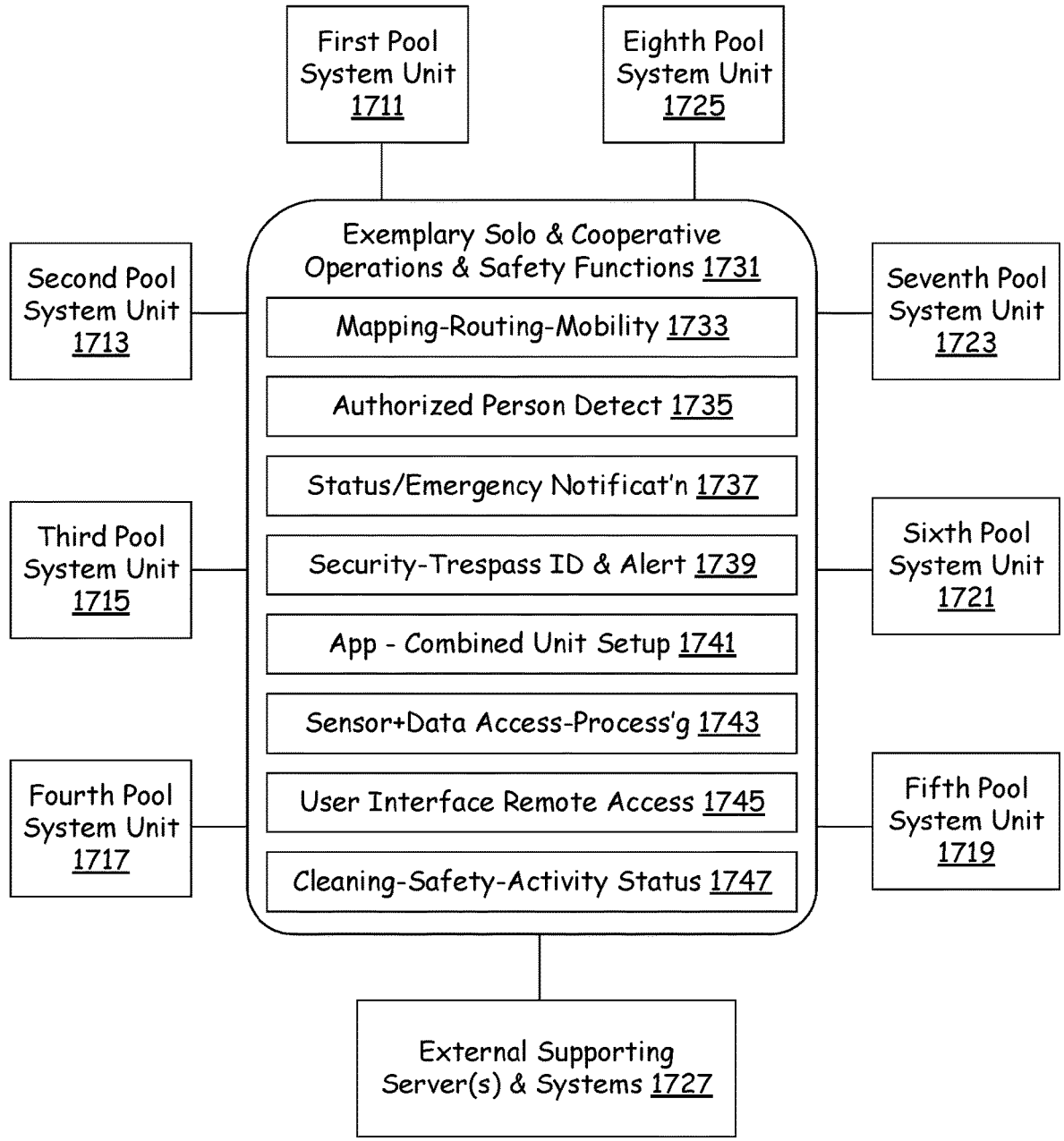
FIG. 17 is a schematic block diagram enumerating exemplary solo and cooperative operations and safety functions provided by the safety monitoring system of FIG. 10, the pool safety system of FIG. 14, etc.

FIG. 17 is a schematic block diagram enumerating exemplary solo and cooperative operations and safety functions 1731 provided by the safety monitoring system 1005 of FIG. 10, the pool safety system 1405 of FIG. 14, etc. These cooperative operations and safety functions include mapping-routing-mobility functions 1733, authorized person detection function 1735, status/emergency notification functions 1737, security-trespass ID & alert functions 1739, an app for combined unit setup 1741, sensors and data access with processing functions 1743, user interface remote access 1745, cleaning with safety features and activity status functions 1747. In addition, various embodiments such as first pool system unit 1711—eighth pool system unit 1725 etc. provide some or all of these functions based on their needs and usage patterns. Access to external supporting server(s) and systems 1727 is provided as necessary, such as access to a local police server system or access to a local remote security monitoring systems.

The mapping-routing-mobility functions 1733 makes it possible to map out the layout, shape and geo-coordinates of the swimming pool. For example, a map created is subsequently used for determining if a user in the pool is in trouble, such as by incorporating the depth of the pool into an analysis of the swimming style of the swimmer and the audio inputs received, etc. Similarly, the map created is also used in guiding an inflatable safety device or a drowning prevention device operating within swimming pool waters towards the potential drowning victim. By analyzing the current position of a swimmer, and factoring in the age, style and experience of the swimmer, and incorporating the depth of the pool into an ongoing safety analysis, a warning message or an advice is provided by the safety monitoring system supporting a swimming pool area to the swimmer as appropriate. For example, a warning message can be "Stay away from the deep side of the pool". Similarly, an advice can be "Stay closer to the edge while you swim", etc.

As one of ordinary skill in the art will appreciate, the terms "pool cleaner unit" as may be used herein, include smarter versions of underwater vacuum cleaning devices, swimming pool robots, water-pressure based pool cleaners, etc.

As one of ordinary skill in the art will appreciate, the terms "swimming pool" as may be used herein, include hot tubs, Jacuzzis, water parks, water fountains, ponds, lakes, etc. where people typically swim or float and where there is an element of danger for swimmers and others in vicinity.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

Although the present disclosure has been described in terms of GPS coordinates/and navigational information communication involving mobile phones and computers, it must be clear that the present disclosure also applies to other types of devices including mobile devices, laptops with a browser, a hand held device such as a PDA, a television, a set-top-box, a media center at home, robots, robotic devices, vehicles capable of navigation, and a computer communicatively coupled to the network.

The present disclosure has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

It should be clear that the term "pool mobile unit" used herein includes aquatic, vehicles, driver-assisted aquatic mobility vehicles, driver-less aquatic vehicles, etc. It also includes a self-drive aquatic vehicle or a driver assisted aquatic vehicle. The pool mobile units 141, pool mobile unit 511, pool unit 611 across the figures could be configured features and capabilities described herein. All of the concepts herein could be included in pool mobile units configured to be passenger or passenger-less aquatic vehicles, self-driver aquatic vehicle, driver assisted aquatic vehicle, swimming equipment, and sea mobility equipment.

The present disclosure has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A safety monitoring system operating at least in part within swimming pool waters, the safety monitoring system comprising:
    a mobility element;
    a rechargeable battery;
    a sensing element;
    processing circuitry that interacts with the sensing element to at least assist in identifying a potential drowning event before a potential victim enters the swimming pool waters; and
    communication circuitry that delivers information regarding the event.

2. The safety monitoring system of claim 1 wherein the communication circuitry delivers the information to an out of the water device.

3. The safety monitoring system of claim 1 further comprising a cleaning element.

4. The safety monitoring system of claim 1 further comprising a wireless charging element.

5. The safety monitoring system of claim 1 further comprising a speaker element operable upon the identification of the potential drowning event to deliver output in an attempt to deter the potential victim from entering the swimming pool waters.

6. The safety monitoring system of claim 1, further comprising a mobility element with a solar charging element, and wherein the mobility element being operable to position the solar charging element to enhance charging rates.

7. The safety monitoring system of claim 1 having a buoy element.

8. A safety monitoring system operating in a swimming pool area that includes a swimming pool, the safety monitoring system comprising:
    a sensing element;
    processing circuitry that interacts with the sensing element to at least assist in identifying a potential drowning event in the swimming pool area before a potential victim enters the swimming pool;
    communication circuitry that delivers information regarding the potential drowning event; and
    speaker element operable upon the identification of the potential drowning event to deliver output in an attempt to deter the potential victim from entering the swimming pool.

9. The safety monitoring system of claim 8 wherein the identifying of the potential drowning event comprises identification of the potential victim as being unauthorized.

10. The safety monitoring system of claim 9 wherein the identification of the potential victim as being unauthorized comprises a failure of a face recognition process to identify the potential victim as being one of a plurality of previously authorized swimmers.

11. The safety monitoring system of claim 10 wherein a cell phone alert message is delivered upon detecting the failure.

12. The safety monitoring system of claim 8 wherein the sensing element comprises an image capture element.

13. The safety monitoring system of claim 8 wherein the potential victim comprises an animal.

14. The safety monitoring system of claim 8 wherein the delivery by the communication circuitry triggers an alert indication on a cell phone.

* * * * *